United States Patent
Alles et al.

(10) Patent No.: US 10,038,982 B2
(45) Date of Patent: Jul. 31, 2018

(54) SYSTEM AND METHOD FOR INFORMATION ENHANCEMENT IN A MOBILE ENVIRONMENT

(71) Applicant: CommScope Technologies LLC, Hickory, NC (US)

(72) Inventors: Martin C. Alles, Vienna, VA (US); Suryanarayana A. Kalenahalli, Chantilly, VA (US); Andrew E. Beck, Ashburn, VA (US); Thomas B. Gravely, Herndon, VA (US); Javier F. Cereceda, Asburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/119,967

(22) PCT Filed: Feb. 18, 2015

(86) PCT No.: PCT/US2015/016311
§ 371 (c)(1),
(2) Date: Aug. 18, 2016

(87) PCT Pub. No.: WO2015/126901
PCT Pub. Date: Aug. 27, 2015

(65) Prior Publication Data
US 2017/0064514 A1    Mar. 2, 2017

Related U.S. Application Data

(60) Provisional application No. 61/941,252, filed on Feb. 18, 2014.

(51) Int. Cl.
*H04W 4/02* (2018.01)
*H04W 4/04* (2009.01)
(Continued)

(52) U.S. Cl.
CPC ............ *H04W 4/028* (2013.01); *H04W 4/023* (2013.01); *H04W 4/029* (2018.02); *H04W 4/04* (2013.01); *H04W 4/043* (2013.01); *H04W 64/00* (2013.01)

(58) Field of Classification Search
CPC ............ G06Q 30/0643; G06Q 20/208; G06Q 10/0833; G06Q 30/0261; H04B 1/3827;
(Continued)

(56) References Cited

U.S. PATENT DOCUMENTS 8,818,706 B1 * 8/2014 Ogale ................ G01C 21/005
340/539.1
2006/0179050 A1    8/2006 Giang et al.
(Continued)

OTHER PUBLICATIONS

International Search Authority, "International Search Report and Written Opinion from PCT Application No. PCT/US2015/016311", dated May 26, 2015, pp. 1-11, Published in: WO.
(Continued)

*Primary Examiner* — Kwasi Karikari
(74) *Attorney, Agent, or Firm* — Fogg & Powers LLC

(57) ABSTRACT

This disclosure pertains to systems and methods that may be used to increase the information content of a mobile device so as to locate, track, or determine the behavior of a mobile device and/or the user of the mobile device. Separate pieces of information (information snippets) may be aggregated over time to form information linkages. The snippets and linkages may be associated with a time stamp and/or a time frame. The snippets and linkages may be associated with a probability value which may be updated as more information is acquired. The snippets and linkages may be aggregated with, for example a building floor plan to provide more complete informational description of the mobile device and/or the behavior of the user of the mobile device (information map).

33 Claims, 10 Drawing Sheets

(51) Int. Cl.
*H04W 64/00* (2009.01)
*H04W 4/029* (2018.01)

(58) Field of Classification Search
CPC ....... H04W 4/02; H04W 4/008; H04W 4/027;
H04W 4/025; H04W 84/12; H04W 4/023;
H04W 4/028; H04W 64/00
See application file for complete search history.

(56) References Cited

U.S. PATENT DOCUMENTS

| | | |
|---|---|---|
| 2011/0288771 A1 | 11/2011 | Mazlum et al. |
| 2013/0107728 A1* | 5/2013 | Zhu .................... H04W 64/006 370/252 |
| 2013/0165145 A1 | 6/2013 | Alles et al. |
| 2014/0004881 A1 | 1/2014 | Alles et al. |

OTHER PUBLICATIONS

Zhu et al, "Indoor/Outdoor Location of Cellular Handsets Based on Received Signal Strength", "Vehicular Technology Conference, 2005 (VTC 2005-Spring), 2005 IEEE 61st", May 30, 2005, pp. 92-96, vol. 1, Publisher: IEEE.

\* cited by examiner

SYSTEM AND METHOD FOR INFORMATION ENHANCEMENT IN A MOBILE ENVIRONMENT

RELATED APPLICATION

The present application claims priority benefit of U.S. Provisional Application No. 61/941,252, filed Feb. 18, 2014 entitled "Information Enhancement in a Mobile Environment", which is hereby incorporated herein by reference.

BACKGROUND

This disclosure pertains to systems and methods that may be used to increase the information content of a mobile device. In general, mobile devices are currently operated as a communication medium, particularly where the informer and the informee are known to each other and preconfigured to communicate. Some mobile devices may be configured by the user to register location information such as by using satellite, signal information. However, typical mobile devices in use today underutilize the information potential of which mobile devices are capable. That information content, when realized, may be used for a variety of functions/operations such as, but not limited to, determining a location for the mobile device (particularly where satellite signals are not present), determining a path taken by a mobile device, tracking a mobile device, determining interactions between mobile devices and/or between a mobile device and an information-generating device, and deducing behavior of a user of the mobile device based on any of the above. This behavioral information may be useful for the user, vendors, police, etc.

Of particular interest are information types that have some contextual relationship to location. As a non-limiting example, consider a mobile device that is located in a store. Assume that the device is initially in a state of zero information regarding the store, i.e., the device does not know where it is in the store, has no idea where items of interest to the user may be found, has no knowledge of any store special offers, if the store is in a mall, has no knowledge of where other features of interest in the mall may be located, and has no knowledge of current activities of interest that may be in the mall.

In this setting, an objective of the user would be to gather information of whatever sort, including the items listed above, as the mobile moves around in the store. Furthermore, just as one would have found out about things in the distant past where, one obtained information while walking around and asking people one passes or meets, the mobile may operate in an analogous manner today albeit while not involving any actual physical query directed at some other mobile user.

In an embodiment, mobile devices have several features that will soon be universally present on nearly every mobile device. These include a magnetometer that measures magnetic field, an accelerometer that measure acceleration, and a gyroscope that measures angular rate. All of these measurements are made with respect to axes that are fixed on the mobile. If the mobile device is viewed as a rectangle by assuming the thickness of the device is trivial, then in an embodiment the x-axis is an axis parallel to the shorter side of the rectangle and passing through the center of the rectangle. The y-axis is an axis parallel to the longer side of the rectangle and passing through the center of the rectangle. The z-axis is an axis normal to the rectangle and passing through the center of the rectangle. Typically, the z-axis is defined by the right hand corkscrew rule, or equivalently as the cross product of vectors along the x and y axes. In this context one could also visualize a world frame with axes X, Y, and Z. Generally, the mobile frame (x, y, z) and the world frame (X, Y, Z) are not identical. The mobile orientation is a measure of its relative orientation with respect to the world frame.

Additionally, in other embodiments, the mobile device may also have other sensors such as as barometer, a light sensor, a proximity sensor, a temperature sensor or a humidity sensor. The mobile device may also be capable of making other measurements. These measurements may include the ID or MAC address and additionally measurements of power on any Wi-Fi Bluetooth transmitter or other transmitter. The mobile may also take a video, or pictures or scans of QR codes, or listen to audio via the microphone, or other similar information from information-generating sources.

In an embodiment it is assumed that there is some mobile application (herein referred to as an "App") to which many users for example in the store setting referred to above) subscribe. The App may be either manually activated or may be automatically turned on by recognition of some feature of the environment. Non-limiting examples of the latter are a particular Bluetooth beacon being within range or the presence of a particular Wi-Fi access point within range.

Embodiments of the present disclosure view elemental behavior in time using a construction referred to herein as "snippets" from which may be formed, in an embodiment, geometric objects (which may be color coded) known as "linkages" which have to be fit into a topological framework such as a map and/or a building plan. Certain embodiments use ideas derived from the AI literature on automated solution of jigsaw puzzles to perform this fitting.

SUMMARY

Embodiments of the present disclosure take advantage of the untapped potential of mobile devices and use enhanced information content to provide a variety of new functionalities not previously realized by mobile devices or their users.

In an embodiment, a method of locating a mobile device is disclosed where the method includes; determining a plurality of information snippets from one or more sensors associated with a mobile device; determining an information linkage from ones of the plural snippets; determining an information map for the mobile device using the linkage and a predetermined map; and locating the mobile device based on the information map.

In another embodiment, a method of locating a mobile device is disclosed where the method includes; determining a first plurality of information snippets from one or more sensors associated with a mobile device wherein each of the first plurality of snippets has associated therewith a probability value, and wherein first ones of the first plural snippets have a respective start time and an end time, and wherein the start times of the first ones of the first plural snippets are at or after time $T_1$, and wherein the end times of the first ones of the first plural snippets are at or before time $T_2$; determining an information linkage from second ones of the first plurality of snippets wherein the linkage has associated therewith a linkage probability value; determining an information map from the information linkage, and a predetermined map, wherein the information map includes a first path having an initial first path probability value and a second path having an initial second path probability value, and wherein each of the first and second paths includes the information linkage; determining a second information snippet from the one or more sensors, wherein the second information snippet has a start time $T_3$ where $T_1 \leq T_3 \leq T_2$; correlating the first and second paths with the second snippet and adjusting the initial first and second path probability values based on the correlation; updating the information map by removing the first or second path having a lower adjusted path probability value; and determining, based on the updated information map, a location of the mobile device, wherein the mobile device is located for a time $T_4$ where $T_1 \leq T_4 \leq T_2$.

In a further embodiment, a method of locating a mobile device is disclosed where the method includes: determining a first plurality of information snippets from one or more sensors associated with a first mobile device; determining a first information linkage from ones of the first plural snippets; determining a second plurality of information snippets from one or more sensors associated with a second mobile device; determining a second information linkage from ones of the second plural snippets; determining an information map from the first linkage, the second linkage, and a predetermined map, wherein the information map includes: a first path having a first path probability value and a second path having a second path probability value, wherein each of the first and second paths includes the first linkage and a third path having a third path probability value and a fourth path having a fourth path probability value, wherein each of the third and fourth paths includes the second linkage; providing synchronizing information to the first and second mobile devices; correlating the first, second, third, and fourth paths with the synchronizing information and adjusting the first, second, third, and fourth path probability values based on the correlation; updating the information map by removing the first or second path having a lower adjusted path probability value between them and by removing the third and fourth path having a lower adjusted path probability value between them; and locating the first mobile device based on the updated information map.

In yet a further embodiment, a method of locating a mobile device is disclosed where the method includes: determining a plurality information snippets from one or more sensors associated with a mobile, device; determining an information linkage from ones of the plural snippets; providing a predetermined map including a building plan and at least one location of a fixed electromagnetic, visual, or audio beacon device, wherein the predetermined map includes navigable space, and wherein: a first portion of the navigable space is partitioned into rectangular space, a second portion of the navigable space is partitioned into a free-form shape, and the beacon device is assigned an attribute; determining an information map from the information linkage and the predetermined map, wherein the information map includes a first path having a first path probability value and a second path having a second path probability value, wherein each of the first and second paths includes the information linkage, and wherein the information map includes the attribute; locating the mobile device based on the information map.

DETAILED DESCRIPTION

Figure 1:
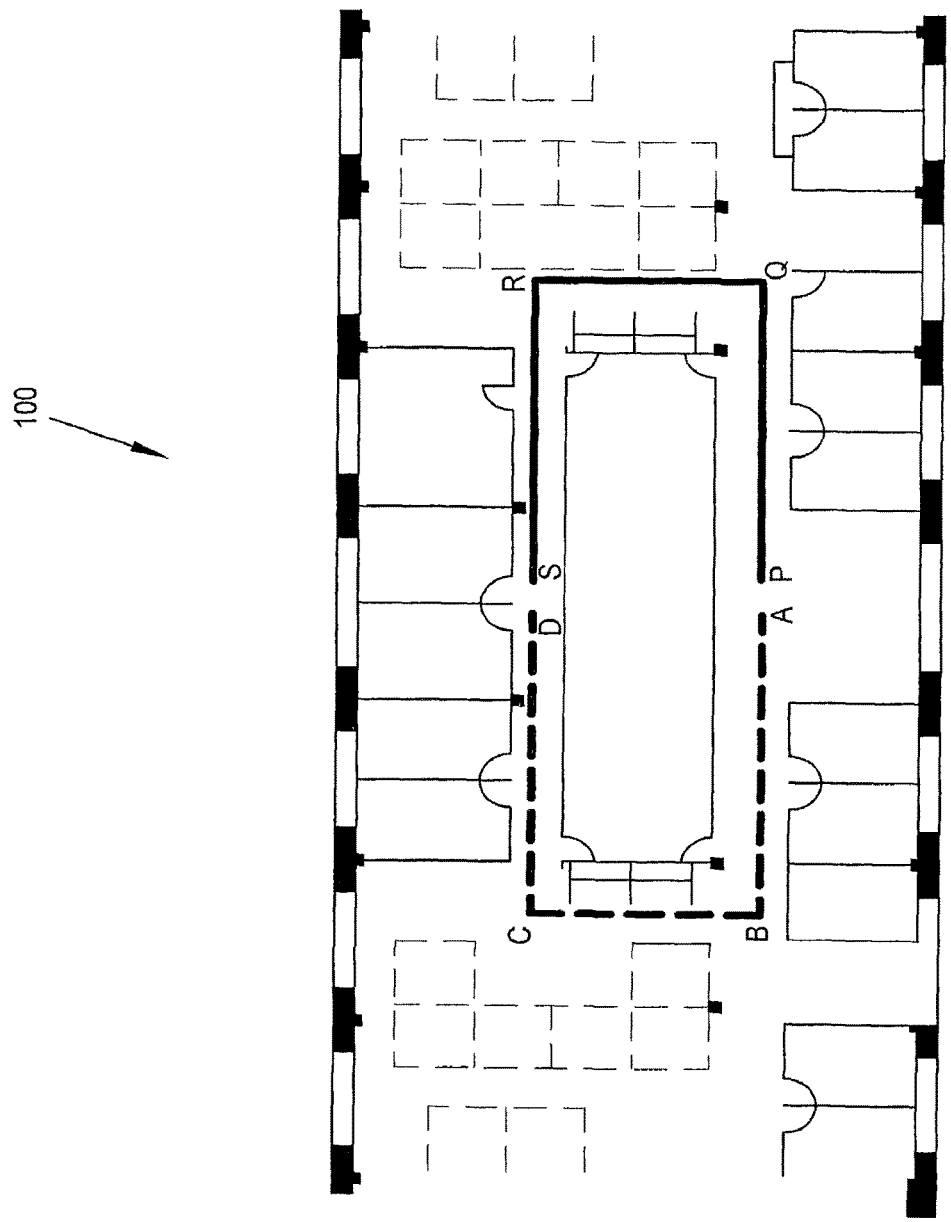
FIG. 1 is a diagram of a building plan showing information snippets and information linkages according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus the following description is provided as illustrative of the principles of the present subject matter and not in limitation thereof and may include modification thereto and permutations thereof. While the following exemplary discussion of embodiments of the present subject matter may be directed towards or reference specific terminology used herein, it is to be understood that the discussion is not intended to limit the scope of the present subject matter in any way and that the principles presented are equally applicable otherwise.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

In an embodiment, the inventive methodology includes three sources of information; self-generated information which may include information generated by the observations made by a particular mobile device; information acquired from other mobile devices; and information acquired via the App. Information that may be used by the disclosed methods may not always be strictly assigned to just one of these sources of information and thus these categories, in certain embodiments, may be viewed as somewhat fluid.

Self-generated information may include one or more of the following: measurements made on the environment such as, but not limited to, recognition of beacons, Wi-Fi access points, other transmitters, information from QR codes, microelectromechanical systems ("MEMS") information over time segments, as detailed in following sections, etc.

Information acquired from other mobile devices may include information derived from one mobile communication with another mobile. In certain embodiments, this ability is enabled by the App. As a non-limiting example, when a first mobile recognizes that it is in the vicinity of another mobile the App on the first mobile may decide that some information on the second mobile is of value to the first mobile and may cause that information to be transferred, typically automatically but requiring user input from one or both mobile users is also contemplated in some embodiments. Additionally, the first and second mobiles may each recognize proximity and then each may communicate as discussed above and mutually share information.

Information acquired via the App may include a situation where the App may be considered as a master source of information. As a non-limiting example, the App on a first mobile device may determine, based on all the information the first mobile device has in its possession, that some further information that the App has is of value to the first mobile device and the App may either pass this information to the firm mobile device or the App may associate the information with the first mobile device.

Certain embodiments may include the situation where all information is stored on the mobile device, where other embodiments may include the situation where all information is stored in the App. In the latter case it may be assumed that there is some controlling entity physically removed from the mobile device which may be part of the App and which decides exactly what information should be associated with every mobile device running the App. Still further embodiments include the situation where some of the information is stored on the mobile device and other information is stored in the App.

Information Elements (Snippets)

A concept of the disclosure is the aggregation of separate pieces of information (which may or may not appear to be related when viewed individually) over blocks of time. These pieces of information, when suitably woven together, may be linked up and thus provide a more complete informational description of the mobile device and/or the behavior of the user of the mobile device. Examples of these pieces of information are listed below. Those of skill in the art will readily understand that the list is not all-inclusive and is not intended to be limiting of the scope of the disclosure. The terminology used herein for a piece of information is "Information Snippet." In an embodiment an information snippet is a piece of information bounded to lie within a specific time window. In certain embodiments, an information Snippet may be associated with an assigned probability and doing so accommodates the use of a set of snippets to represent the particular information piece. These snippets can be considered as limited in time and fully contained in a window of time. In one realization of an embodiment, the information within the window is highly reliable. However, if the window is extended in time beyond this window of time, e.g., by widening the window of time, the information thus may become unreliable. Therefore, in certain embodiments, a typical snippet has a start time Ts, and an end time Te, as well as some information that can be associated with the interval [Ts, Te]. In a more general view, one can conceive of a set of possible snippets associated with some information, where each such snippet has a different probability. In this latter view, one can think of the time window as stretching or shrinking and each such distortion having a different probability expression of the snippet.

Thus, information snippets, in particular embodiments, may be thought of in one or more of the following forms:

(a) a piece of information, typically a behavior, fully contained in a time window [Ts, Te]. The behavior starts exactly at time Ts and ends exactly at time Te. Individual snippets can however overlap in time;

(b) a piece of information that has a start time Ts and an end time Te both of which have some probability distribution. The behavior can then have different durations and/or start times with each behavior model having a different probability of realization;

(c) an alternate view to (b) is that the behavior is defined over some time duration analogous to a spring that can be either compressed or expanded. So, the behavior stays the same (as in the list of snippets that follows later) but there is a penalty associated with having to compress or expand the time window. This model is most applicable to snippets that represent some form of motion.

An information snippet that has some unknown or unreliable behavior within the window [Ts, Te] should not be considered a snippet. In such a case, the behavior should be broken into two (or more) snippets (which may be referred to herein as "sub-snippets") such as two snippets with times [Ts, Te1], [Ts1, Te] where in each such window the behavior can be expressed as in a standard snippet form (note that Ts1>Te1, where Te1 is the end time of the first sub-snippet and Ts1 is the start time of the second sub-snippet).

In the user/store interaction scenario introduced above, it is also of value to consider the situation where the mobile device user may have in his possession a cart. Such a cart may be a typical shopping cart generally built using metal wire which may impact MEMS measurements.

Information Snippet Examples

The below is a non-exhaustive listing of typical information snippets. Those of skill in the art will readily understand that other information snippets may be useful given the embodiments of the disclosure discussed herein and that the scope of the disclosure is in no way limited to only those examples given below. The list includes a snippet characteristic as well as a non limiting exemplary method by which the snippet may be realized.

1. Steady walk in fixed direction without cart:
   1.1 Steady accelerometer step signal, gyroscope shows no turns. Magnetometer may show continuous variation, no phone calls
   1.2 Steady accelerometer step signal, gyroscope shows turns, phone call. Magnetometer may show continuous variation.
   1.3 Steady accelerometer step signal. Beacon comes in and later out of range. Gyroscope shows no turns. Magnetometer may show continuous variation.
   1.4 Magnetometer can be pattern matched to calibration data, either in three dimensions or in two dimensions.
   1.5 Steady accelerometer step signal. Variations in received signal from Wi-Fi or Bluetooth transmitters. Gyroscope shows no turns. Magnetometer may show continuous variations.
2. Steady walk in fixed direction with phone in cart:

2.1 Low or no accelerometer step signal. Magnetometer shows continuous variation, Gyroscope shows no turns. Accelerometer shows phone tilt as very stable.
2.2 Gyroscope shows no turns. Magnetometer shows peak to trough behavior that distinguishes the environment.
2.3 Variations in received signal from Wi-Fi or Bluetooth transmitters.
3. Steady walk in fixed direction with phone in same hand as that pushing cart:
3.1 Weak step signal, Magnetometer shows continuous variation, Gyroscope shows fluctuation but no turns. Accelerometer shows phone tilt varying through a small range.
4. Steady walk in fixed, direction with phone in pants pocket:
4.1 Step signal, Magnetometer shows continuous variation, Gyroscope shows oscillation with about a 45 degree angle, but no aggregate angle or turn.
5. Steady walk in fixed direction with phone in shirt pocket:
5.1 Step signal, Magnetometer shows continuous variation, Gyroscope shows minor fluctuation and no turns. Light sensor shows near 0 Lux.
6. Continuing walk with a right turn:
6.1 Steady accelerometer step signal, gyroscope shows a turn. Magnetometer may show continuous variation. Use Accelerometer and Gyroscope to determine direction and by how much.
7. Continuing walk with a left turn:
7.1 Steady accelerometer step signal, gyroscope shows a turn. Magnetometer may show continuous variation. Use Accelerometer and Gyroscope, to determine direction and by how much.
8. Seated with phone in shirt pocket. Go from seated to standing:
8.1 Accelerometer magnitude goes above gravitation and then returns. Gyroscope shows no angular change. Magnetometer may show small change. Light sensor shows near 0 Lux. All changes are quite quick.
9. Standing with phone in shirt pocket Go from standing to seated:
9.1 Accelerometer magnitude goes below gravitation and then returns. Gyroscope shows no angular change. Magnetometer may show small change, Light Sensor shows near 0 Lux. All changes are quick.
10. Stationary and standing with phone in pocket:
10.1 No variation in any MEMS data. Accelerometer data indicates phone is vertical. The light sensor shows near zero Lux.
11. Stationary and standing with phone in hand:
11.1 No large variation in any MEMS data Accelerometer indicates phone is not either vertical or horizontal. Magnetometer data stays nearly the same. The proximity sensors on the smart phone indicate that the phone is being held close to the body.
12. Standing, phone in hand, no cart. Hand moves from hip level to head level:
12.1 Accelerometer shows a large but quick change. Magnetometer data may stay the same. Gyroscope shows angular change. All changes are fast.
13. Standing, phone in hand, no cart. Hand moves from head level to hip level:
13.1 Accelerometer shows a large but quick change. Magnetometer data may stay the same. Gyroscope shows angular change. All changes are quite quick.
14. Stationary and seated with phone in shirt pocket:
14.1 No variation in any MEMS data. Accelerometer data indicates phone is vertical—X axis. Light, sensor shows near 0 Lux.
15. Stationary and seated with phone in pants pocket:
15.1 No variation in any MEMS data. Accelerometer data indicates phone is near vertical—Y axis.
16. Phone on table:
16.1 Accelerometer data exhibits no steps, fixes orientation in Z dimension. Magnetometer data constant. Gyroscope shows no angular changes. All measurements are very steady.
17. Seated in chair, phone in pocket, spinning:
17.1 Accelerometer shows no steps but continuing variation in X, Z dimensions (phone frame) gyroscope shows accumulating angle in Y dimension.
18. In Elevator going up:
18.1 Accelerometer magnitude significantly larger than gravitation. Magnetometer data changes rapidly.
19. In Elevator going down:
19.1 Accelerometer magnitude significantly smaller than gravitation. Magnetometer data changes rapidly.
20. Fixed Beacon discovered:
20.1 Bluetooth or other Transmission source such as signal comes into range. The App identifies beacon as a fixed beacon. The ID is noted.
21. Fixed Beacon power determined:
21.1 A Bluetooth beacon or Wi-Fi access point is discovered. An associated RSSI is computed.
22. Moving towards Fixed Beacon:
22.1 A fixed Bluetooth beacon or Wi-Fi access point is discovered and the power is increasing over time.
23. Moving away from Fixed Beacon:
23.1 A fixed Bluetooth beacon or Wi-Fi access point, is discovered and the power is decreasing over time.
24. Mobile beacon discovered:
24.1 A mobile beacon has come into range (if beacon is not a fixed beacon, come alive momentarily and turn on self beacon, transmit ID, turn off. App handles identification and information adjustments).
25. Mobile Beacon power determined:
25.1 A Bluetooth or other mobile beacon is discovered. An associated RSSI is computed.
26. QR code discovered:
26.1 Phone has been scanned against a reference image. Note the ID. Note phone in hand at that time fixing orientation of phone within limits.
27. At Fixed Beacon, have cart:
27.1 Magnetometer calibration data near beacon does not match current observation. In particular, no match exists anywhere at beacon range periphery.
28. Near fixed beacon, walking:
28.1 Accelerometer step signal. Fixed beacon comes into range. Fixed beacon then goes out of range. If other phone information data indicates fixed phone orientation, App can calculate an approximate length of arc traversed.
29. Climbing up a stair-case:
29.1 The barometer sensors indicate the changes in the air pressure. This helps estimate the altitude (floor). The pressure decreases.
30. Walking down a stair-case:
30.1 The barometer sensors indicate the changes in the air pressure. This helps estimate the altitude (floor). The pressure increases.
31. Mobile device location estimated:
31.1 Using a pattern matching technique such as MLDC.

31.2 Using any other method of mapping a sequence of observations to a location.

31.3 Observing a change in measurements such as would occur with an infra-red or other sensor due to signal interruption, blockage or other modification.

31.4 Bought item at a particular register in the store whose location is known

32. Mobile device in pocket or handbag:

32.1 Light sensor indicates ambient darkness. Time of day indicates daytime.

33. In high humidity area:

33.1 Humidity sensor indicates high humidity. Weather data for general area indicates ambient humidity much lower than sensor reading.

A snippet may also be partitioned further into a set of smaller (in time) snippets that may overlap but whose overall latest time is Te and earliest time is Ts. This may be particularly applicable when the sub-snippets have varying degrees of reliability. So for example the snippet S0 defined over [Ts, Te] and having probability 0.9 may be broken into two snippets S1 and S2 with times [Ts, Te1], and [Ts2, Te], where the first of these has probability 0.99 and the second 0.75 and where Ts<Ts2≤Te1.

The references to pattern matching visualize the use of a technique such as Mobile Location by Dynamic Clustering ("MLDC") as described in U.S. Pat. No. 8,526,968 the entirety of which is hereby incorporated herein by reference, which makes a series of observations on the environment over some interval of time to produce a location estimate.

With respect to Snippet 2.1, in an embodiment the vertical acceleration that is derived as a projected component of the accelerometer measurement would not be smooth (compared to the case where the cart is absent) and the measurements would likely vary significantly.

Viewing Snippet 2.3 more generally, in an embodiment it may be desirable to be able to compute the distance traversed. The accelerometer measurement is usually a good indicator of the distance traversed, however, in this case, as explained above the accelerometer measurement will not be useful to compute the steps traversed. In such cases, one could use the magnetometer measurements together with the gyroscope measurements to find the most likely segments on a map that the target might have traversed in that observation interval. The perceived magnetic field varies quite rapidly in an indoor environment and this variation in the magnitude of magnetometer readings can be correlated with distance traversed. One simple method is to count the total number of peaks and troughs encountered in the magnitude of magnetometer measurements and compare this to a pre-computed map of the absolute magnitude of the magnetic field for that area and determine the likely segments on the map where the current observation might fit. Alternately one could examine the two-dimensional magnetic field where the field components are taken along the gravitational axis and perpendicular to it in the plane of the aggregate field. The accelerometer measurements, along with the gyroscope measurements, will significantly reduce the number of likely places on the map where the target could be during this observation interval.

With respect to Snippets 24 and 25, in an embodiment, the App may store a list of fixed beacons for the region. If the discovered beacon is not among the list of stored fixed beacons, the discovered beacon is declared to be a mobile beacon. The App may update the list of mobile beacons in the area on this basis. This information may later be changed to reflect a fixed beacon if some number of or all other users also see this same beacon in approximately the same location over an extended period of time.

Information Algorithm Framework

In an embodiment, the intent of the information algorithm is to use the snippets to construct an Information Map ("IM") for the mobile device. As used herein, an information map is a virtual map of directed or undirected line segments termed arcs, denoting motion segments where each arc may have specific related information associated with it. If the line segment is directed it is a two dimensional vector. Each arc may have a start time and an end time.

In an embodiment, a typical information arc is a line with it start time and an end time and event descriptors that may include any activities the user indulged in during that time. A non-limiting example of an activity may be a textual description such as "shopping for long sleeved shirts", or "made a phone call", or "looked up coupons for toaster ovens". Each of these textual descriptions has an information content of value to the mobile.

In an embodiment, the Information Algorithm ("IA") may take some or all of the information arcs for one, two, or all of the mobile devices as well as other information available in the App such as building plans, store sales information, and nearby event information and associates all of this information in order to place these arcs in multiple locations, where each such location placement has an associated probability. It may be seen that initially the information map is actually a large collection of probabilistic maps, where each map has a certain probability.

As more information comes into the IA it may update the maps, dropping certain maps if the aggregate map probability drops below a predetermined threshold. Thus as information flows in, the maps coalesce until finally the map shows regions of very high probability.

Since every mobile device (user) has such a map associated with it, it is conceivable that some aggregate maps can be near certain (i.e., probability of 1) for certain devices/users while at the same time having multiple alternate maps with varying probabilities for other devices.

If one examines the projection of the IM over any user plane, the map is then a probabilistic representation of the device/user location over time, space, and information content. Thus for multiple users there are multiple such planes and the planes interact through certain information snippets, thereby updating the probabilities of the individual maps.

In certain embodiments, time is used with high priority in the algorithm. For example, consider that there are two snippets with start times Ts1, Ts2 and end times Te1, Te2. Now each of these snippets has multiple mappings in the IM if taken individually. However since these snippets refer to the same user, then based on all the information for that user it constrains where these snippets can be located. A user who walks at a normal pace cannot move more than some fixed distance in the interval [Te1, Ts2]. Thus, the snippets force a mutual realignment and adjustment of the IM. This is a very simple example of the interrelationships of the snippets and should not be interpreted to limit the disclosure in any way.

In another simple exemplary embodiment, the snippets for two distinct users may interact. Consider the snippets bounded in time for each user as [Tu1$s$, Tu1$e$], [Tu2$s$, Tu2$e$], respectively. If viewed individually these snippets would have some probability assignments in the IM. Now let us assume that at some time Tm the devices interacted via, for example, a Bluetooth beacon (snippet 20), where Tm is within the time snippets (i.e. Tm<max(Tu2$e$, Tu1$e$), Tm>min(Tu1s, Tu2s). Then this immediately forces an adjustment to the IM that is composed of possibly changed location arcs and associated probability; the time Tm acts as a prayerful force on the IM.

The foregoing examples show a general approach whereby each snippet of information adjusts the IM. In an ideal situation, every user/device resolves to a single map with probability one. More realistically, the map for any given user may have regions or very high probability and other regions where the map has several user planes. So, there may be time windows where the map is a single map with probability one and other time windows where the map splits up into multiple alternate maps with different probabilities.

In a further embodiment, another type of information snippet may be defined by a category we may refer to herein as User Interest. So, for example, consider that a device user examines, using her mobile device (with the App observing throughout) a series of dresses available in a mall. If we have other snippets that indicate the device as been stationary for a considerable amount of time, and another snippet that indicates entry to the mall (say passing a particular fixed beacon) the probability of placing the user in specific areas of the mall increases and thus adjusts the IM.

Constructing Information Maps from Snippets

In this section we consider more specifically how the IM is constructed for multiple users. To visualize this let us consider a simple, non-limiting example where we have three mobile devices (users) within a store located in a mall.

Let us assume that all three users have the App turned on. We assume that the App has access to the mall layout, building plan, the location of various items, locations of specific QR codes that may be positioned around the mall, locations of fixed beacons (possibly Bluetooth beacons), location of Wi-Fi transmitters, and user information. By user information we include any information that may be of analytical use to the specific nature of the App. For example, if the App is specific to that store, it may have a user profile indicating some user biographical data and use interests. The App may know that the user has recently examined certain coupons or items on sale. The App may also know that the user has been showing an interest in a particular item over the last few weeks and has yet to purchase it. And generally, the App has some visualization of use intent based on all this knowledge. Any one or more of these assumptions may be relaxed; the intent being to demonstrate the construction of the IM with all of these sources in play for the purposes of this exemplary discussion.

When the three users enter the store, they pass a fixed beacon (Snippet 20, 21, 22, 23). The App then constructs three maps for the three users that have all the information it can derive from all sources. It knows what time each user passed this beacon, and the walk speed with which the user came into beacon range and left beacon range (Snippet 24). The maps can be visualized as layers or planes. The three users correspond to three planes (think of sheets of printer paper) lying suspended in the air one above the other. Let the times of entry of the three users be T01, T02, and T03, respectively.

If no further information is available, the maps are then tailored to show probabilistically where each user is at any given time T using the user profile and the elapsed times (T-T01), (T-T02), and (T-T03) and, for example, MEMS information. Assume that the MEMS information shows that each of these users is walking with fixed speed in a fixed direction over time intervals (Snippets 2 through 4) T1, T2, and T3, respectively. Then the App may construct three arcs or linear segments to correspond to these paths and integrates this with the elapsed time information and the fixed beacon placement. This results in a probabilistic placement of each user in their IM plane. If no further information ensues over a considerable time, then the individual maps eventually become uniform in the location aspect: the three users are randomly anywhere on their planes.

Now given this equiprobable setting, let us say that User 1 starts to examine coupons for dresses stored on the App. The equiprobable map will then show a relative peak in the section of the store where dresses are on display. Shortly after this let's say we see that the same user exhibits a walk segment (Snippet 3, say) of extended duration. The App examines the store floor plan to determine all possible linear segments that fit the snippet and examines if any such snippet can be linked to the dress display area. If there are such segments the probability on these segments rises whereas the probability elsewhere, drops.

Now assume that User 3 comes into view of User 1 via a short range mobile beacon (Snippet 20). User 3's IM is then adjusted to align with User 1's IM, with the probability or information flow from User 1 to User 3. Very shortly thereafter User 3 scans a QR code (Snippet 21). This is a defining event in that User 3 will then be assigned a probability peak in his IM with respect to location. Furthermore, if the QR code was placed near a particular display, it may be an indication of interest in that display, so User 3's information content may be updated to show an interest in Men's Suits the location of the QR code; assuming that the App user knows that scanning such a QR code may release coupons or sale items in the vicinity.) Now consider the effect of User 3's behavior on User 1. User 1's IM may be reorganized to fit all of the past snippets of User 1 to align with the event of mutual recognition with User 3. In other words, the past is also reorganized so that it is coherent with the present, just as in general the present is made coherent with the past. Thus, the discovery of a QR code by User 3 had major implications for the IM map not just for User 3 but also for User 1. The interaction of multiple users in this manner has very useful implications for constructing the IM.

Thus we see that while all the users explore their environments independently, the short range mobile beacons may act as synchronizers across the individual user's IM planes. This is a very valuable observation since it is a main trigger for information exchange between mobile devices.

Now consider User 2. Assume User 2 has had no interaction with the other two users. The App knows that User 2 has his mobile beacon turned on. At this point in time, User 2 has a generally equiprobable IM map in the location aspect. Let's now assume that we obtain four snippets for User 2 indicating a long stationary duration, a long walk, a 90 degree turn and another long walk. Assume that these snippets may generate two possible paths, each of which has the same probability (e.g., there are no other ways to fit this sequence in the store layout). Now assume that a Snippet 20 event occurs with User 1. This will cause one of these paths to be dropped from the IM of User 2. Her past behavior is now fixed: we know which path she was on. Now from the store layout and display information we can fix where she spent that long stationary time. Let's say this was in the Children's winter-wear section. The IM for User 2 may now be updated to reflect that User 2 has an interest in items related to Children and particularly winter clothes. The App may then or later (if knowing that the woman did not purchase any item), present her with information on sale items in that category. Her IM will also be updated with this information.

The Action of the App in all these instances is to make coherent sense of the entirety of mobile device/user behavior, including location and interests. The past information is adjusted to cohere with the present, just as much as the present information must cohere with the past.

From the location aspect, the IM can be thought of as multiple segments with time tags at start and finish that have numerous placements on the map with different probabilities. The work of the App is to tie these pieces of information together in a coherent manner. QR codes, fixed beacons, and mobile beacons can often act powerfully as synchronizing events, reducing the probabilistic complexity of each individual IM while forcing the maps of different users to also cohere.

So for example if User 1 sees User 2 now (where User 2 may be considered a mobile beacon) and also saw User 3 Tp minutes previously, it is clear that the maps of all three users are adjusted to make sense of this observation. In an embodiment, information may flow until a best or most coherent view of the present and past is constructed.

It is also of interest to consider the situation where a user has been well located and is being tracked. In such a case if we examine all the information associated with that user, it could potentially lead to discovering new information that can be recorded in the App. Thus, for example, if User 5—having been tracked for a significant length of time where this tracking is of very high probability—shows the existence of some as yet unreported Wi-Fi signal at a particular place on the floor plan, this information can lead to modification of the information associated with the floor plan. If the observation is repeated either by the same user, User 5, over a long time duration, or if multiple well tracked users also report the existence of this signal, the App may place a Wi-Fi access point in the most likely location of the floor plan by estimating where the signal strength is highest.

In addition, consider the situation where some group of users share substantially the same information over some time window. In such cases, those users with some excess of information over the others can share some of that information with the other users. This may happen by the App adjusting the IM for all users and, as alluded to previously, have information flow from higher information users to lower information users, subject to the deduction that all of the users in the group must be experiencing the same environment in that time window.

Information Linkages

In certain embodiments, consider the snippets that pertain to a particular mobile device/user. One can lay these snippets out in time. If one does that, we expect that in many cases there are instants of time where there is no applicable snippet or snippets (note that snippets can in fact overlap in time). So, there may be windows of time where there is no applicable snippet. This can be equally true even if we represent each individual snippet by a set of snippets with different probabilities (of course only one member of the set is picked as the representation): even the most improbable representation may still leave some unaccounted for time between the separate snippets.

If we further consider those snippets that are closely linked with positioning, consider the case where we have three snippets that occur sequentially in time with descriptions as follows:

(a) A straight line walk segment of length L1. Time: [T1, T2].

(b) A 90 degree right handed turn. Time: [T3].

(c) A straight line walk segment of length L2. Time: [T4, T5].

Let us also assume that the total information the App has on this user indicates maximum speed of movement (e.g., when not in a car) of a walking speed V meters per second. That is, the use hardly ever runs with the phone. Then the intervals [T2, T3] and [T3, T4] are indeterminate in terms of position. But the maximum distance the user could cover in these times is d1=V*(T3−T2) and d2=V*(T4−T3).

Now we can visualize two pieces of string (i.e. a "Logical String" to represent a distance that can be any length from zero up to some fixed length beyond which it cannot increase) of length d1 and d2 connected to two straight lengths of wire (to represent a distance that has a fixed length and shape) of lengths L1 and L2 with a very short bent piece of wire (bent at 90 degrees) joining them. Whatever actual positioning of the user exists in the interval [T1, T5] can be represented by this construction which then must be imposed onto a map of the environment. Clearly the positioning of this linkage is constrained—it can fit in only certain ways into the environmental model (e.g., a store layout or building plan). Thus, as one obtains more snippets the ambiguities disappear and the user IM in the location aspect becomes tighter in terms of probability.

A construction of the above form where one connects up a series of snippets and may, but not necessarily, include the use of the logical equivalent to a Piece of String (i.e., a Logical String) to represent time spans that are lacking in information is termed herein as an Information Linkage.

Some snippets in an Information Linkage may have no linear dimensions. For example, the discovery of a beacon or a snippet that represents being motionless. These are indicated on the linkage as events and are matched as described below.

In an embodiment, a general problem we attempt to solve can then be phrased as how one fits an Information Linkage into some constrained environment, with the extension to doing so for multiple users or devices simultaneously.

One way to approach fitting an information linkage into the environment would be the blind approach of testing every viable point and attempting to place the linkage at each point. A computer program can be written to achieve this end which would examine every point in the environment for the placement of one end of the linkage and determine if the rest of the linkage can be positioned there. If there are six different placements that are viable in the environment, one could assign equal probability to each of these six assignments until they are resolved, by further information.

Another approach would be to position any given "turn snippet" in the information linkage at every location where such a turn is feasible. Having positioned the turn, an attempt is made to position the remaining parts of the linkage. This method would be generally less time consuming than the former.

Additionally, consider where at certain times (the time window in this case shrinks to a very narrow window) a location of the mobile device/user is obtained by some other means. An example of this is the pattern matching technique known as MLDC (see associated Snippet above). In such a case we have an approximate location, A, of the user at some time instant contained in the interval [T1, T5], say [T2, T2+deltaT]. This then threes the information linkage to have to be located in the vicinity of A which then greatly reduces the computational effort required to place the linkage appropriately.

It is obvious that more efficient algorithms can be designed and those of skill in the an will readily understand that the scope of the present disclosure is equally applicable to any such algorithms. A non-limiting example of a more efficient algorithm is as described above with respect to the process of looking first for locations where the turn information allows positioning of the right hand turn snippet.

In an embodiment, a feature of this approach is to represent those time windows with no positional information by the logical equivalent to a physical piece of string whose length can be calculated based on the adjoining snippet times. Following this a linkage is constructed and location regions where the linkage may be positioned are found. These locations may then be given some probability in the IM for that user.

Example 1

With attention drawn to FIG. 1, a diagram of a floor plan 100 is shown. Consider, as a nonlimiting exemplary embodiment, that we have five snippets, as follows:
Snippet 1: [0 s 9 s]; straight line walk;
Snippet 2: [9 s, 9.5 s]; right hand 90 degree turn;
Snippet 3: [9.5 s, 15 s]; straight line walk;
Snippet 4: [15 s, 15.5 s]; right hand 90 degree turn;
Snippet 5: [15.5 s, 24.5 s]; straight line walk.

In this case there is no time interval within [0 s, 24.5 s] with zero information. Thus, the linkage of these snippets has no Logical String component. The mobile device is known to be on a particular floor of a building and the building plan is known. The IM for this user is known and has typical walk speed information which matches the information in the snippets.

The Information Linkage is the end to end connection of the five snippets to form Linkage 1. The problem is to determine the IM for the mobile device given these snippets and the resulting linkage.

Linkage 1 can fit in the building plan in one of two positions. These positions are shown in FIG. 1 and are Path 1 (which includes line segments AB (Snippet 1), BC (Snippet 3), CD (Snippet 5) with their relative orientations shown in FIG. 1 as set by Snippets 2 and 4) and Path 2 (which includes line segments SR (Snippet 1), RQ (Snippet 3), QP (Snippet 5) with their relative orientations shown in FIG. 1 as set by Snippets 2 and 4). Based on this, the IM for the mobile device exhibits two equiprobable paths. Both paths have probability 0.5.

Example 2

Figure 2:
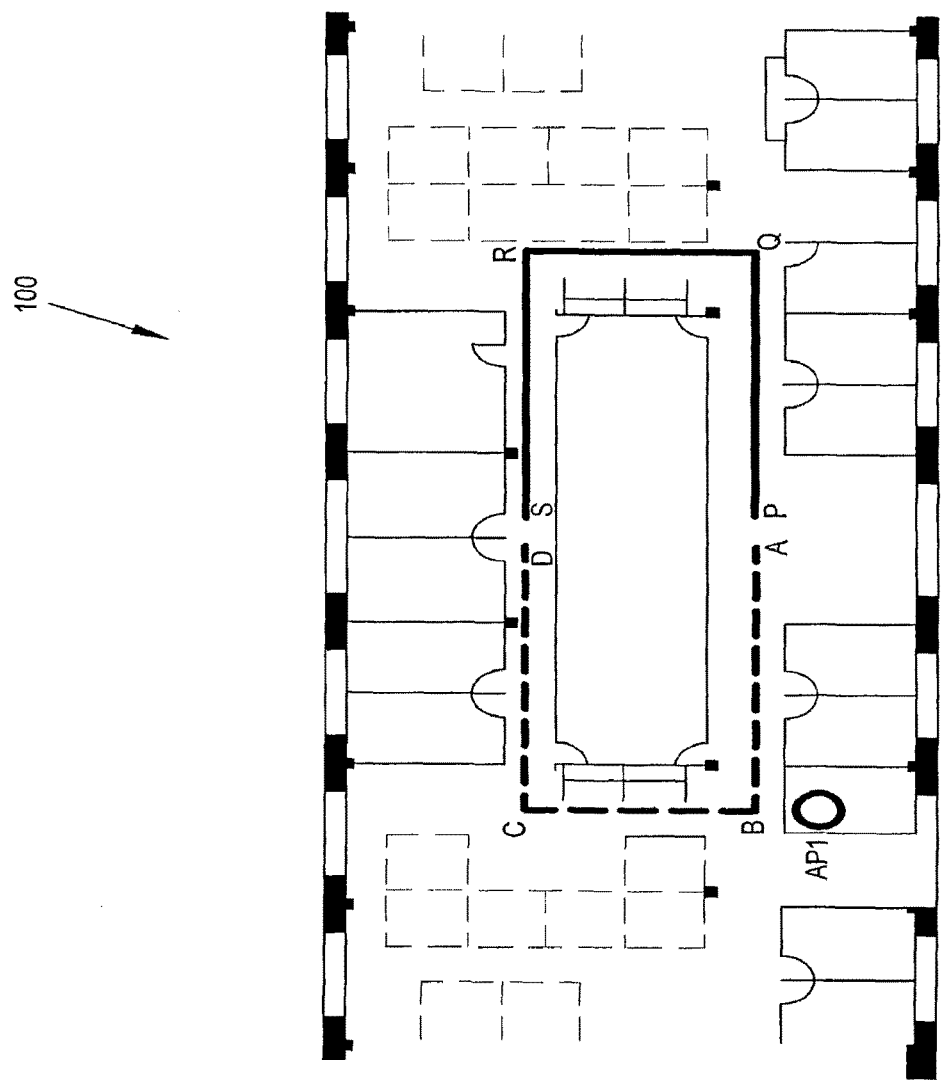
FIG. 2 is another diagram of a building plan showing information snippets and information linkages according to another embodiment of the resent subject matter.

Now turning to FIG. 2, the diagram of a floor plan 100 in FIG. 1 is shown with the addition of a Wi-Fi Access Point AP1. In this example there are eight snippets, as follows;
Snippet 1: [0 s, 9 s]; straight line walk;
Snippet 2: [9 s, 9.5 s]; right hand 90 degree turn;
Snippet 3: [9.5 s, 15 s]; straight line walk;
Snippet 4: [15 s, 15.5 s]; right hand 90 degree turn;
Snippet 5: [15.5 s, 24.5 s]; straight line walk;
Snippet 6: [3 s, 15 s]; device sees Wi-Fi Access Point AP1;
Snippet 7: [3 s, 9 s]; device sees Wi-Fi Access Point AP1, and the power is increasing;
Snippet 8: [9 s, 15 s]; device sees Wi-Fi Access Point AP1, and the power is decreasing.

Note that Snippets 1-5 in FIG. 2 are the same as Snippets 1-5 in FIG. 1. In this example as well, there is no time interval within [0 s, 24.5 s] with zero information. Thus, the linkage of these snippets has no Logical String component. The mobile device is known to be on a particular floor of a building and the building plan (100) is known. The IM for this user is known and has typical walk speed information which matches the information in the snippets.

The Information Linkage is the end to end connection of the eight snippets to form Linkage 2, Note that there is overlap in time regarding Snippets 6, 7, and 8 and Snippets 1, 2, 3, and 4. The problem is to determine the IM for the mobile device given these eight snippets and the resulting linkage.

Linkage 2 can be viewed as Linkage 1 of the previous example in FIG. 1 with additional information added. Taking into account the additional information, i.e., Snippets 6, 7, and 8 (which each include information regarding Wi-Fi Access Point AP1), it is apparent that only Path 1 (incorporating line segments AB, BC, CD) is probable and thus the IM for the mobile device must now show this with a probability of Path 1 at or near unity and the probability of Path 2 at or near zero (since Path 2 is now not very probable given the additional information of Snippets 4, 7, and 8).

Example 3

Figure 3:
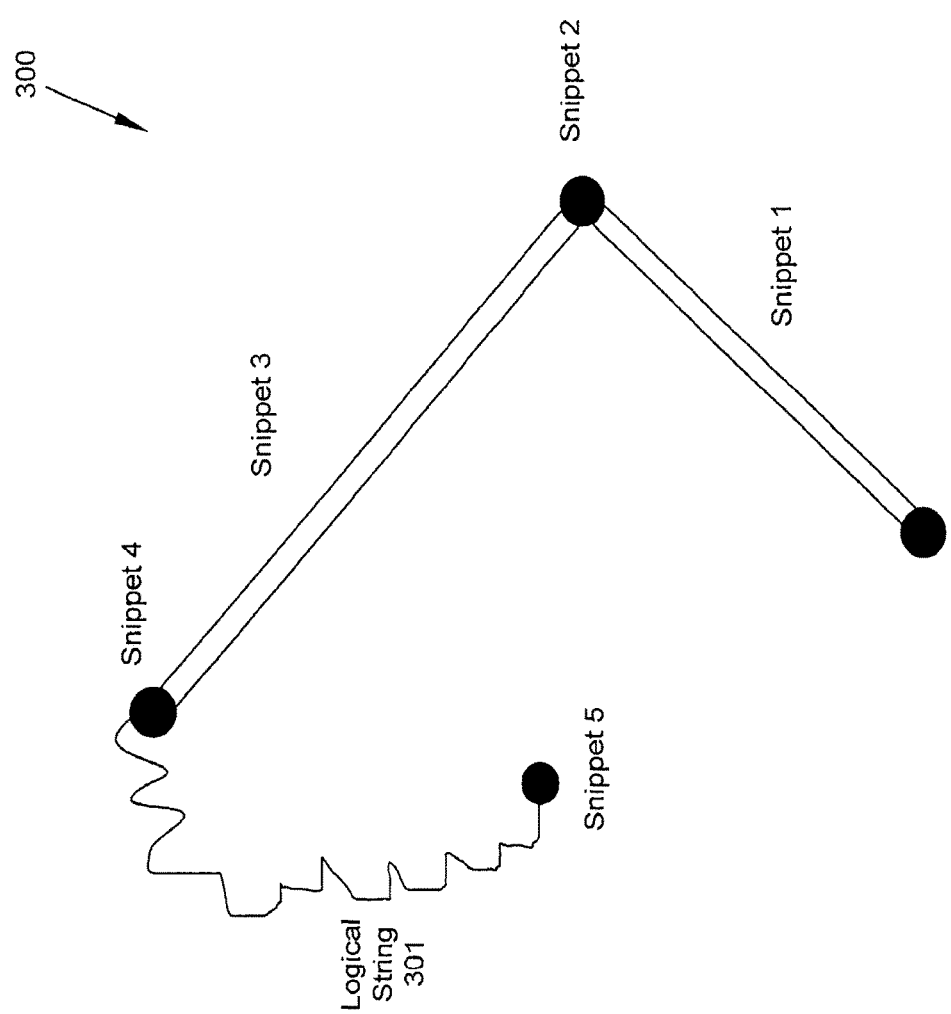
FIG. 3 is a pictorial diagram showing an information linkage including information snippets 1-5 and a logical string according to an embodiment of the present subject matter.

Considering FIG. 3, a pictorial diagram is shown illustrating an Information Linkage 300 including Information Snippets 1-5 and a Logical String 301 according to an embodiment of the present subject matter. For this exemplary embodiment, consider the following Snippets:
Snippet 1: [0, 6 s]; straight line walk;
Snippet 2: [6 s, 6.2 s]; left hand 90 degree turn;
Snippet 3: [6.2 s, 15 s]; straight line walk;
Snippet 4: [14 s, 3 min]; device sees Wi-Fi Access Point AP1;
Snippet 5: [23 s, 3 min]; phone is flat and motionless.

In this example there is a time interval [15 s, 23 s] in which the information obtained does not translate into any representation with linear dimensions such as a rigid linkage. Thus, the linkage of these snippets has a Logical String component. As with the above examples, the mobile device is known to be on a particular floor of a building and the building plan (labeled 100 in FIG. 4) is known. The IM for this user is known and has typical walk speed information which matches the information in the snippets. The Information Linkage in this example is the end to end connection of Snippets 1-5, including a Logical String, to form Linkage 3. The problem is to determine the IM for the mobile device given these snippets and the resulting linkage.

Since there is no information available in the interval [15 s, 23 s], the linkage must show Logical String 301 in that time. Thus Linkage 3 looks like the object 300 shown in FIG. 3, The Logical String 301 in this case can carry coded information to express the fact that it is within range of Wi-Fi access point AP1 shown in FIG. 4.

Figure 4:
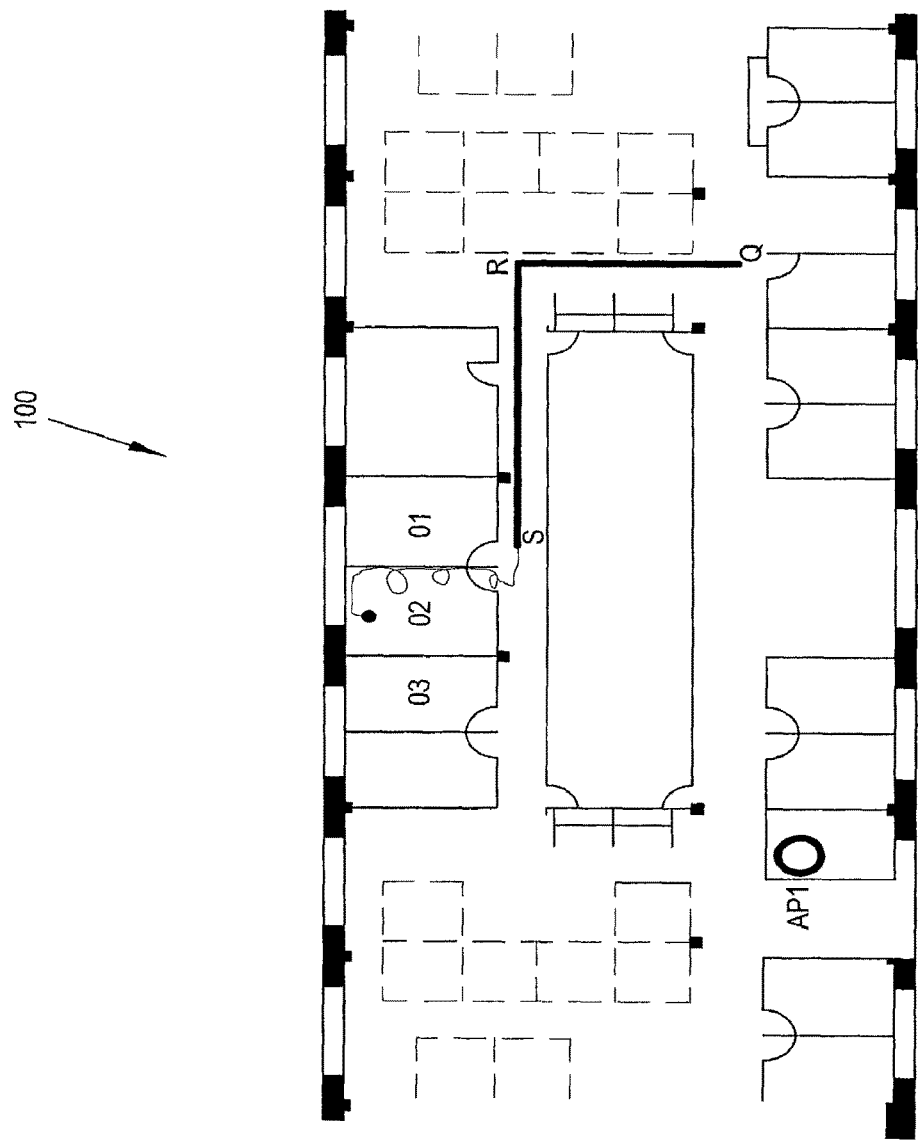
FIG. 4 is a diagram of a building plan showing a possible placement of the information linkage of FIG. 3 according to an embodiment of the present subject matter.

Since there was no walk information reported after time 23 s, and since the phone is very likely flat on a table or desk given Snippet 5, the IM for the device may show the three offices O3, O2, and O1 in FIG. 4 as candidate locations and assign, for example, probabilities 0.3 and 0.4 and 0.3, respectively. These probabilities could have been obtained from past history information on the mobile device from the App were the office O2 has been entered by the user more often than offices O1 or O3, and with approximate frequencies in the ratio of these probabilities. Thus, the placement of Linkage 3 in the building plan 100 is as shown in FIG. 4.

Example 4

Figure 5:
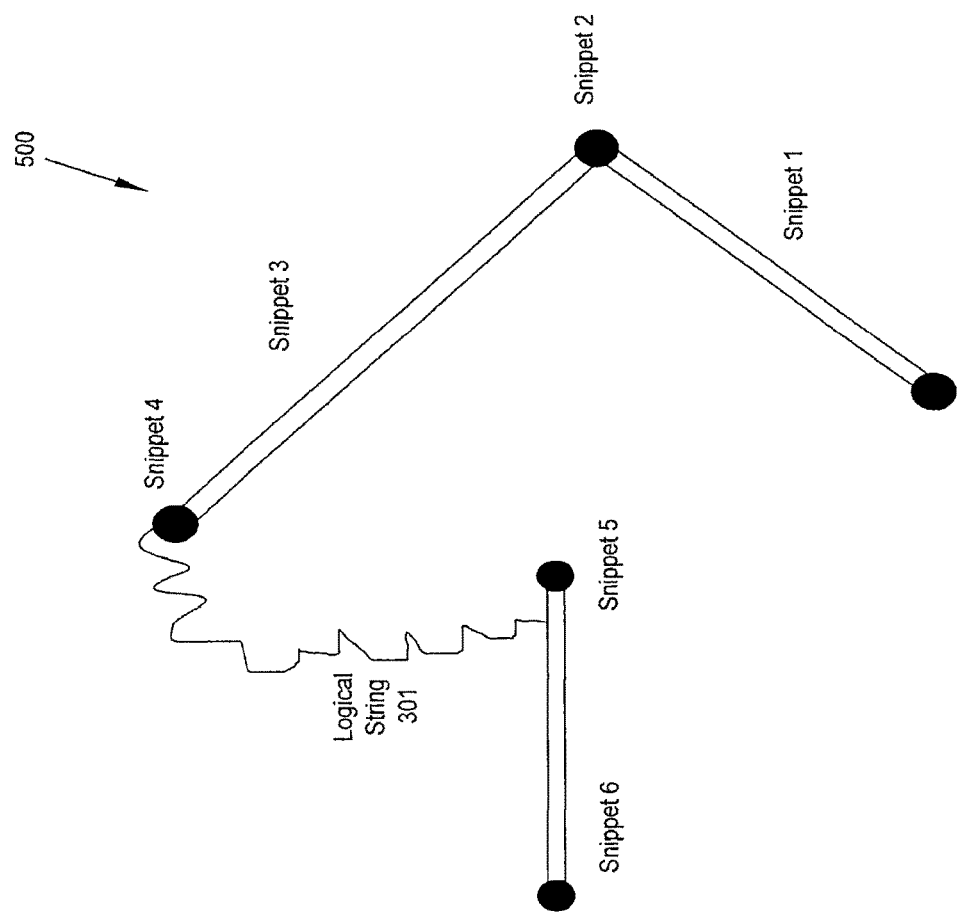
FIG. 5 is a pictorial diagram showing an information linkage including information snippets 1-6 and a logical string according to an embodiment of the present subject matter.

Considering FIG. 5, a pictorial diagram is shown illustrating an Information Linkage 500 including Information Snippets 1-6 and a Logical String 501 according to an embodiment of the present subject matter. For this exemplary embodiment, consider the following Snippets:

Snippet 1: [0, 6 s]; straight line walk;
Snippet 2: [6 s, 6.2 s]; left hand 90 degree turn;
Snippet 3: [6.2 s, 15 s]; straight line walk;
Snippet 4: [14 s, 3 min]; device sees Access Point AP1;
Snippet 5: [21 s, 3 min]; phone is flat and motionless;
Snippet 6: [3 min, 3 min 06 s]; straight line walk.

This example is an extension of Example 3 where we have an additional snippet of length 6 s (Snippet 6). As in Example 3, the time interval with zero information has a Logical String component in the linkage. Snippet 5 is now followed by a straight line walk of length 6 s (Snippet 6). This example illustrates that it is possible to have a Logical String placed between two rigid snippets. As with the above examples, the mobile device is known to be on a particular floor of a building and the building plan (labeled 100 in FIG. 6) is known. The IM for this user is known and has typical walk speed information which matches the information in the snippets. The Information Linkage in this example is the end to end connection of Snippets 1-6, including a Logical String, to form Linkage 4. The problem is to determine the IM for the mobile device given the snippets and the resulting linkage.

Since there is no information available in the interval [15 s, 23 s], the linkage must show Logical String 301 in that time. Thus Linkage 4 looks like the object 500 shown in FIG. 5. The Logical String 301 in this case can carry coded information to express the fact that it is within range of Wi-Fi access point AP1 shown in FIG. 6.

Figure 6:
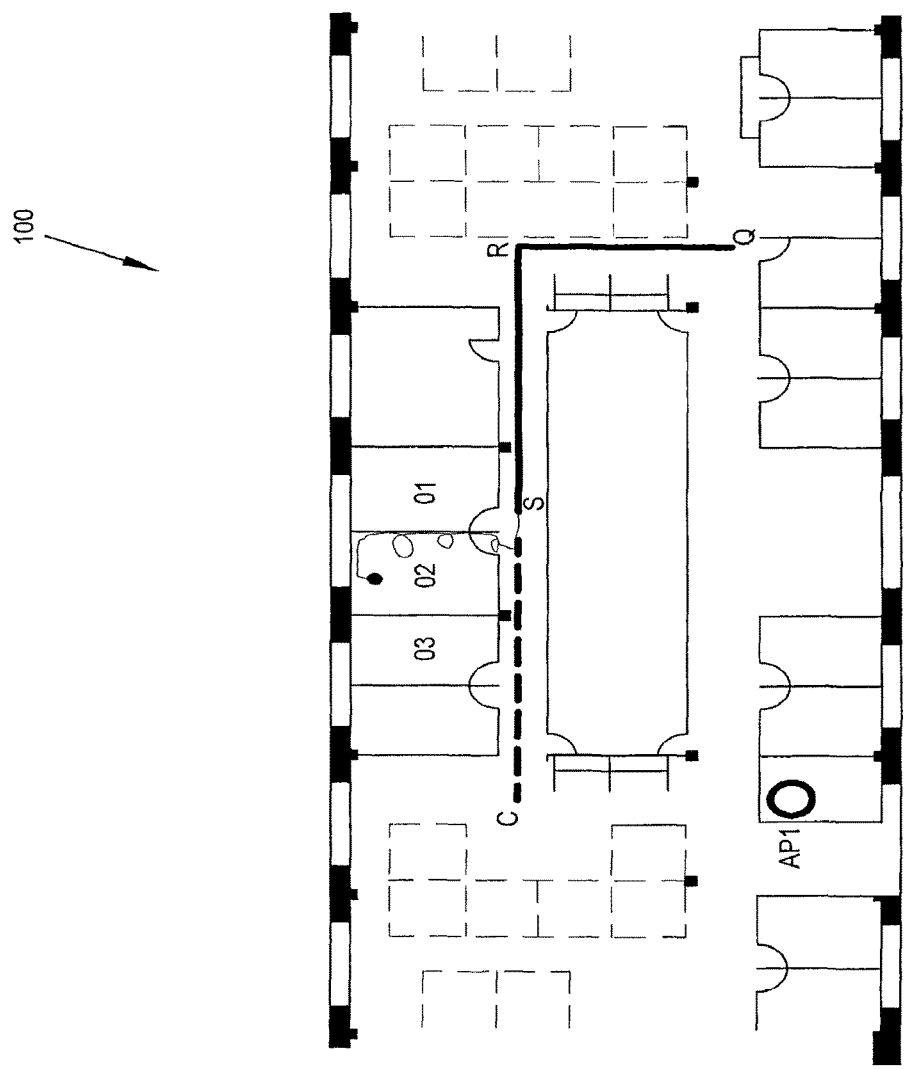
FIG. 6 is a diagram of a building plan showing a possible placement of the information linkage of FIG. 5 according to an embodiment of the present subject matter.

In Example 4, Snippet 5 is followed by a straight line walk as indicated by Snippet 6. Thus, the placement of Linkage 4 in building plan 100 is as shown in FIG. 6.

A Mathmatical Framework for Linkage Placement

Placing the Information Linkage associated with a user or mobile device in the optimal position in a building plan or floor plan is important as it permits the development of a valid IM.

In an embodiment, a model that can be used for this fitting is that of a jigsaw puzzle. We will show that the problem of positioning linkages may be very similar to that of solving a jigsaw puzzle.

If one considers the building plan or floor map, the user movement occurs with certain restrictions. The user behavior can be approximated by movement along straight line segments that are set at different angles to each other. The building plan can be visualized as a jigsaw puzzle that is partially completed. Thus, the walls and passageways and the building structure inclusive of stairways and elevators can be considered to be a 2-D or 3-D puzzle that is partially complete.

The remaining, spaces in this puzzle are the areas in which the user can move. This area can be represented as a space of connected rectangles and open spaces in a first approximation. These rectangles can be either in the horizontal plane or in the vertical plane and have variable length and relatively small width. The pieces to be fit into the puzzle are the linkages which have width less than the width of the remaining spaces in the partially complete puzzle. Multiple puzzle pieces can fit or overlap in the same remaining space. For example, a mobile device user can walk a particular region from A to B in a specified manner and then reverse her walk going from B to A. The open spaces in the partially complete puzzle represent regions where arbitrary user behavior is possible. An example of this could be the open area in front of an elevator.

Consider the placement of a very simple planar linkage. If representing a straight line, walk, this is a rigid object of fixed straight length in one direction and small width. This is the most elementary linkage possible. Depending on its length, there are many places it may fit in the partially complete puzzle. We note that the linkage need not be a straight line or rectangular in shape. A simple linkage could also be an arc of movement. In this case as well we assign it to have a small width.

The paper "Constructing the Topological Solution of Jigsaw Puzzles" J. De Bock et al. 2004 International Conference on Image Processing, (ICIP), incorporated herein by reference, discusses an algorithm for automating the solution of a jigsaw puzzle. However, this paper does not use the printed picture that is typically incorporated, onto the face of a jigsaw puzzle and, therefore, also on the jigsaw puzzle pieces. The use of the printed picture is the natural aspect of solving such a puzzle which humans tend to use. The analogy to picture information is the total information content associated with the linkage. Thus, the building plan also has features such as fixed beacons. Wi-Fi access points, etc., which are the "picture" components that can be matched to similar information encoded onto the linkages where the encoding onto the linkages has been detailed previously. Information types of other forms which relate to the actions of the user can also be thought of as picture components. A non-limiting example of the latter may be specific information that the user is engaged in an activity which makes the linkage at the time more probably placed in certain locations. All of these other types of information may be coded into the puzzle via (a) color schemes, (b) pictures, or (c) visual patterns. Analogous colors and patterns may also be placed on the linkages. Thus for example, the area near a known Wi-Fi transmitter may be colored in red with the redness decreasing as one moves away from the transmitter location. A linkage that sees the transmitter can have a similar red color coding in some part of its body, with the highest redness corresponding to the time at which the Wi-Fi signal was maximum.

Matching a linkage on which an access point such as AP1 in FIGS. 2, 4, and 6 is observed, may then be akin to matching jigsaw puzzle pieces manually where one tries to complete a picture. The matching cost in the algorithm can thus be tailored to include all forms of such information. For example, if Snippet 33 (a high humidity area as discussed above) is part of a linkage to be placed in a mall setting, the linkage is more probably placed near a washroom or an indoor fountain than in the middle of a walkway that has no water around it. Note the inter-relationship with the IM's discussed in previous sections: the framework here is a method of realization applicable to the IM. Another example would be information that strongly suggests that the user is looking at Men's apparel, gleaned from coupons stored in the App which would make the linkage more likely to be in a particular area of the store.

Now consider a more complex linkage that has two rigid straight links R1 and R2 connected by a string of length S. This problem has no immediate analogue in the general jigsaw puzzle framework. It is most like the situation where you have a jigsaw puzzle in which the breakdown of the puzzle (i.e., the collection of puzzle pieces) leaves some pieces tied together, again with a piece of thin string of fixed length. What this means, in the context of a matching algorithm, is that there is a constraint or dependency in placing the links R1 and R2. This can be easily lit into the matching algorithm. A verbal statement of this is: "Find a good match for R1 and a good match for R2, but the length of the linear segments connecting R1 and R2 within the remaining puzzle area must be at most S".

Thus, an algorithm to automate the linkage placement can be stated and developed. In fact, many such algorithms can be hypothesized that achieve the same broad end result.

Additionally, it is of interest to consider situations where string has been used to connect two rigid linkages further. Suppose this length of string was the representation of an absence of linearly expressible (i.e., rigid linkage) information in a time window [Ts, Te], but that there was other information available in that same window. One example may be that in a window [Ts1, Te1] where Ts1>Ts and Te1<Te, a particular Wi-Fi Access Point was observed. If the representation used in the puzzle for this access point is pink coloring, then an appropriate length of string representing the window [Ts1, Te1] would be given the same coloring. Similarly, it is possible for other informational content to be encoded onto the strings in the linkages using colors or markings. When placing pieces of the puzzle we then have to further try to match this information between the existing puzzle and the new pieces to be lit.

Every user or mobile, device has his or her partially completed jigsaw puzzle. One can think of this also as a partially determined IM with the progressive filling in of the puzzle the development of the IM to a higher information state. The puzzle gets filled in as the user ambulates so that the IM becomes better defined. Typically, the puzzle is never fully completed since the user does not explore every part of the building, floor, or mall in a single visit.

In each visit of a particular customer, one can visualize him or her as completing part of the puzzle. However, all his or her visits can be aggregated to form another long term puzzle that may be useful for customer behavior analysis. Such a partially complete puzzle can have other information associated with it such as the total dwell time in various segments, etc., or more detailed textual information as discussed earlier in the IM. The long term solved puzzle is in fact the long term IM.

Each puzzle piece, since it is composed of linkages, has time information embedded on it. Events and behaviors (snippets) can occur along the linkage, and these will have their own time identifiers. For example, a puzzle piece can represent a time span from Ts to Te, with a QR code discovery at time Tq, where Ts<Tq<Te. The linkage may have a part that is colored red with the color deepening at some particular point. The red color may be the power level of a Wi-Fi access point where in the partially completed puzzle the similar coloration exists to represent the power level, and where the color is strongest at the closest location in the remaining open area of the puzzle to the access point.

Since puzzle pieces can sit one on top of another, as long as the associated linkages are only distorted within limits constrained by the probability of such distortions, and since each piece has some time information (either a time stamp or time window, or even multiple times stamps distributed throughout the linkage) it is also possible to aggregate the total time the user/device may have spent at any given location. The latter is clearly of use in customer analytics applications.

When one user sees a mobile beacon of another user, the App may, as discussed previously, adjust the IM of each user so that each user has the best quality information. One can visualize this as happening via an interaction of the partially completed jigsaw puzzles of the two users, with associated movement of linkages, etc. as needed.

A main driver of the algorithm is that we can treat a building plan or floor plan as a partially completed jigsaw puzzle where it happens to be that the spaces remaining in the puzzle are rectangular segments of possibly, but not necessarily, limited width combined with open spaces of various shapes. The open spaces are regions in the partially completed puzzle that can accommodate a multitude of linkage shapes. An example of such an open space would be the space in front of an elevator: a user could navigate to the elevator in a very large number of ways, including arcs of various shapes. Thus, the area in front of an elevator is best represented by some amount of open space. In addition, if a walkway is wide, it may not be best to represent this with a limited width representation in the puzzle. In such cases it may be better to simply treat this also as open space with rectangular boundaries.

The rectangular segments in the remaining space may be angled one to another by one of a small set of discrete angles and may have connections to open spaces connected at various parts. Secondly, all the remaining pieces to be fit are represented by the user or mobile device linkages which have shapes corresponding to the remaining spaces in the puzzle. Thirdly, there are two types of constraints on placement of linkages; feature matching such as happens with beacons etc., which is similar to puzzle picture matching in the human context, and a linear distance constraint resulting from the elapsed time between linkages which can be represented using a piece of fixed length string (i.e., a Logical String). These constraints then modify the basic puzzle solving algorithm.

The problem we are solving is, however, different from the generic jigsaw puzzle problem in the following aspects:

(1) The partially completed puzzle has no evident puzzle pieces per se. Thus, it may be artificially fragmented, it need be, into puzzle pieces without changing the existing layout. The building plan typically is to be simplified into a partially complete puzzle form whose boundaries are straight lines for the most part and curves elsewhere. An arbitrary fragmentation of these boundaries into previously placed puzzle pieces is acceptable. Given a linkage to be placed and a candidate region of the remaining puzzle, this can be achieved, and is mainly driven by contour matching the linkage with the region of the remaining puzzle.

(2) The partially completed puzzle consists only of rectangular segments of limited width and open spaces of arbitrary shape. The puzzle pieces we are trying to fit have less complicated shapes than a typical jigsaw puzzle. Most pieces are straight line segments of small width connected together by discrete turns. Some may have arcs.

(3) The puzzle pieces we are inserting may be tied to each other with a length of string (i.e., a Logical String). This constrains the placement of pieces (linkages) in a manner that is not present in the standard jigsaw puzzle. As a result, the matching cost is more complicated: all parts of the puzzle piece (linkage) need to be found a viable match prior to computing the cost. All puzzle pieces including the string can have features embedded on them. Non-limiting examples of these are colors and patterns.

(4) The insertion of a puzzle piece into the partially completed puzzle does not change the total remaining space. One puzzle piece (linkage) may be placed on top of another so long as neither linkage nor any string is broken by doing so. The linkages, as discussed previously have a most likely shape (mean value) as well as various distortions represented by various probabilities. The initial attempts should typically, but not necessarily, start with the most likely representation. A sequence of linkages may be placed in the puzzle without blocking the placement of a further linkage. Since all of the linkages are tied together somehow in time, all of the pieces to be fit are connected. So, the placement of the linkages is similar to placing a large number of puzzle pieces in one shot. Of course one could algorithmically pursue this one linkage at a time and toss out the solutions that do not allow a valid time sequence to develop. In fact one could even go so far as matching snippets and then discarding solutions that do not realize the mother linkage containing such snippets. In practice, we have found that linkage of 3 to 4 rigid elements are likely best matched at a time.

(5) The concepts of "corner pieces" and "edge pieces" typical of jigsaw puzzle solving methods in artificial intelligence literature are absent. Every piece is an internal piece.

(6) The entire placement can be also performed probabilistically. Multiple realizations of a given linkage, using the spring analogy if needed, can be attempted with different assigned probability. In addition, each possible placement can have a different probability associated with how the linkage matches where it is placed.

(7) It is possible to jointly solve the puzzles representing multiple mobile devices. As we have detailed, re-orienting the IMs of distinct devices may be needed when events such as mutual beacon discovery occur. A similar effect is thus seen if one solves the puzzles jointly. One could even visualize string-like connections between the puzzle pieces of distinct users. Alternately, independent solutions can be derived and then adjusted using the constraining mutual information.

(8) Changing the puzzle features, such as, for example, the color coding to represent observed transmitted signals, if solutions of the puzzle over a long period of time for a single user device or solutions over multiple user devices over a shorter period of time indicate the presence of new features or the removal of existing features.

In various embodiments, the problem we are solving may include one or more of the following concepts:

(1) The representation of the behavior of an observation on a device as timed hounded informational unit, termed Snippets. The simplest Snippet is a behavioral representation that is bounded in time with a given start and end time (time window). The behavior can also be represented by a set of snippets with possibly different start and end times which may be associated with various probabilities. An observation or behavior may have multiple Snippet representations with different probabilities and different applicable time windows. Distinct Snippets associated with different behaviors can overlap in time. An alternate representation is as a spring, where the relaxed position is the most likely and compression or expansion carries some cost or different probability.

(2) The creation of an Information Map of the device using such Snippets, where this Map continues to develop over the passage of time and where the Map aggregates all types of information including past and present location. The Information Map is an aggregate of knowledge about the device including actions, preferences, behaviors, and location. The creation of information Maps for multiple devices and in particular for multiple mobile devices.

(3) Methods of modifying the associated Information Maps when mobile devices can mutually communicate with each other. Mutual communication or mutual location recognition drives the modification of the information Maps so that the information of all devices is enhanced.

(4) Forming a physical object known as a Linkage from elementary Snippets, where these Linkages are particularly applicable to determining location history and navigation. As Snippets have multiple probability views, Linkages also have this property. Linkages are thus a physical representation of different behaviors and observations when viewed over time. When the Linkage has location-related information such as that caused by motion, it can be thought of as an information embedded arc in space absent a frame of reference.

(5) Developing a method of connecting such Linkages, in those cases where there exists an absence of information over certain time windows, by introducing another physical object which is a piece of string of a fixed length. The length of this string may also be viewed as variable with each length being assigned a different probability. In the latter case it has some properties of a spring.

(6) Posing the Navigation and Location problem for a mobile device as a problem of fining these connected physical linkages into a floor map or building plan in a manner that also fits all other types of observations.

(7) Proposing that the linkages, including one or more strings, can be manipulated in multiple views, where these different views are different probability realizations of the linkages.

(8) Generating different solutions of (6) using various probability assignments given to the linkages as in (7).

(9) Solving the fitting problem in (8) using techniques drawn from topology.

(10) Using any or all known automated jigsaw puzzle solution techniques to implement (9), and where certain Information Snippets are congruent to color or picture information on such a jigsaw puzzle. Examples of these are instant location estimates, recognition of transmitters and other beacons, recognition of QR codes etc.

(11) Applying (10) in which the navigable floor space is congruent to the remaining (unfilled) space in a puzzle and the linkages are congruent to the puzzle pieces to be fit.

(12) Converting the navigable floor space into a partially complete jigsaw puzzle by suitably representing all features with rectangular spaces, open free form shapes and additional coloring or other features on the peripheries. In addition carving up, or establishing borders on the filled parts in a manner that would be recognized as a partially completed puzzle.

(13) Implementing (10) but with further constraints on certain dimensions of the linkages, so as to permit linkage overlap in the remaining space.

(14) Providing a novel navigation, location and information solution for a mobile device using (1), (4), (6), (10), (11), (12) and (13).

(15) Applying (14) an multiple devices, with constraints derived from (3), thus resulting in a constrained multiple puzzle completion algorithm.

(16) The exchange of IM information between users in proximity to each other.

(17) Adjusting features of an IM (e.g., puzzle color) for users that traverse the same general floor space, but supply different Snippet data.

Figure 7:
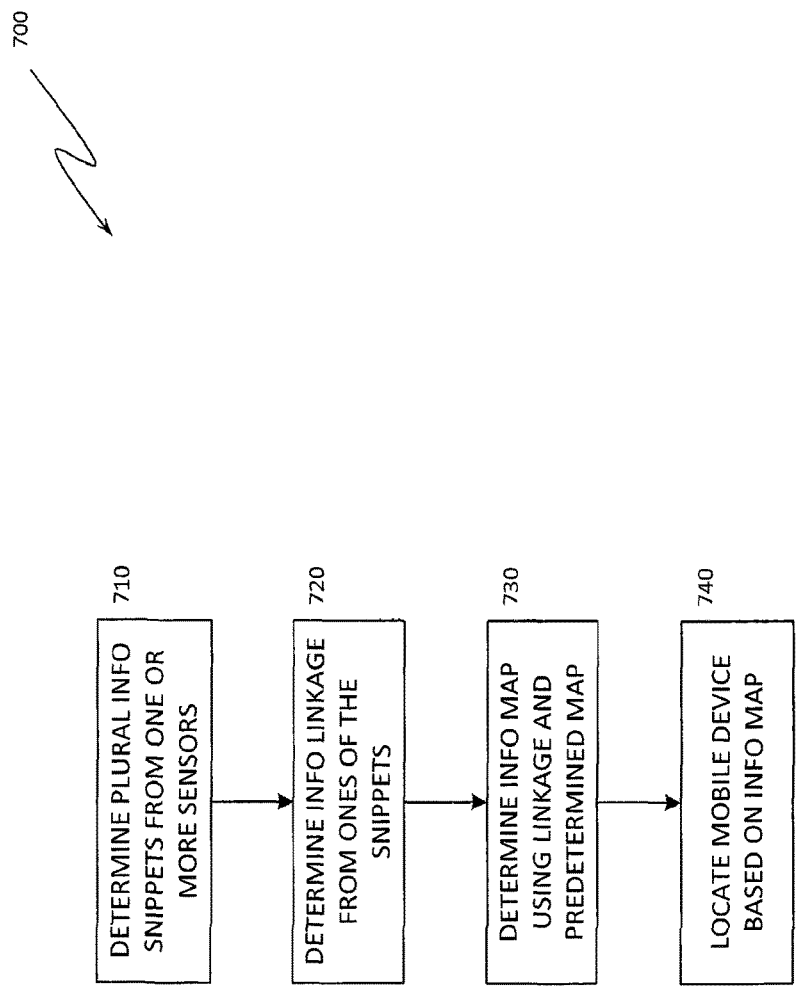
FIG. 7 is a flow chart for a method of determining a location of a mobile device according to an embodiment of the present subject matter.

With attention now drawn to FIG. 7, a flow chart 700 is presented for a method, of determining a location of a mobile device according to an embodiment of the present subject matter.

At block 710, a plurality of information snippets is determined from one or more sensors associated with a mobile device. In an embodiment, the one or more sensors may include one or more of the following: an accelerometer, a magnetometer, a gyroscope, a barometer, a light sensor, a proximity sensor, a temperature sensor, a humidity sensor, an environmental sensor, a biological sensor, is camera a microphone, an electromagnetic sensor, an electromagnetic signal measuring device, an electromagnetic signal analysis device, a communication device, an application program, a user-input device, and combinations thereof. In an embodiment, one of the plurality of snippets may include information received from one or more of the following: a second mobile device, an application program, a wireless electronic beacon signal, a visual code, a QR code, a MEMS device, and combinations thereof. In an embodiment, one of the plurality of snippets may include information such as one or more of the following: a time stamp, a time interval, a probability value, a pattern matching algorithm, an event descriptor, information input to the mobile device, from a user of the mobile device, information from a second mobile device, to predetermined set of information for the user of the mobile device, and combinations thereof. In an embodiment, one of the plurality of snippets is a time-bounded informational unit. In an embodiment, one of the plurality of snippets is a time-stamped informational unit. In an embodiment, a first one of the plurality of snippets is associated with a start time, an end time, and a behavioral information unit. In a further embodiment, at least one of the start time and the end time has associated therewith a first snippet probability value.

At block 720, an information linkage from ones of the plural snippets is determined. In an embodiment, the linkage includes two of the plural snippets and a string which represents a time span between an end time of one of the two snippets and a beginning time of the other of the two snippets. In an embodiment, the linkage has associated therewith a probability value, in an embodiment, the linkage includes a first snippet for which a first distance measurement is determined and a second snippet for which a second distance measurement is determined, wherein, the first and second distance measurements are determined using input from the one or more sensors. In a further embodiment, the first snippet includes a first behavioral information unit of the user and the second snippet includes a second behavioral information unit of the user. In a further embodiment, the first and second behavioral information units are not the same. In an embodiment, the linkage includes a first one of the plural snippets having a start time and an end time and a second one of the plural snippets having a time stamp.

At block 730, an information map for the mobile device is determined using the linkage and a predetermined map. In an embodiment, the predetermined map may contain information such as one or more of the following: an environmental model, a floor plan, a building plan, a location of a fixed electromagnetic, a visual or audio beacon, and combinations thereof in an embodiment, the determination of the information map may include determining one or more arrangements of the linkage within the predetermined map and assigning a probability value to each of the arrangements.

At block 740, the mobile device is located based on the information map. In an embodiment, the mobile device is located as a function of the assigned probability value of one of the arrangements.

In a further embodiment, the first snippet is converted, into a first sub-snippet and a second sub-snippet. In a further embodiment, a start time of the first sub-snippet is earlier in time than a start time of the second sub-snippet and wherein the start time of the second sub-snippet is earlier in time than an end time of the first sub-snippet. In a further embodiment, the first sub-snippet has associated therewith a first sub-snippet probability value and the second sub-snippet has associated therewith a second sub-snippet probability value. In a thriller embodiment, the first snippet includes it first behavioral information unit of the user and a second behavioral information unit of the user and wherein the first sub-snippet does not contain the second behavioral information unit.

Figure 8:
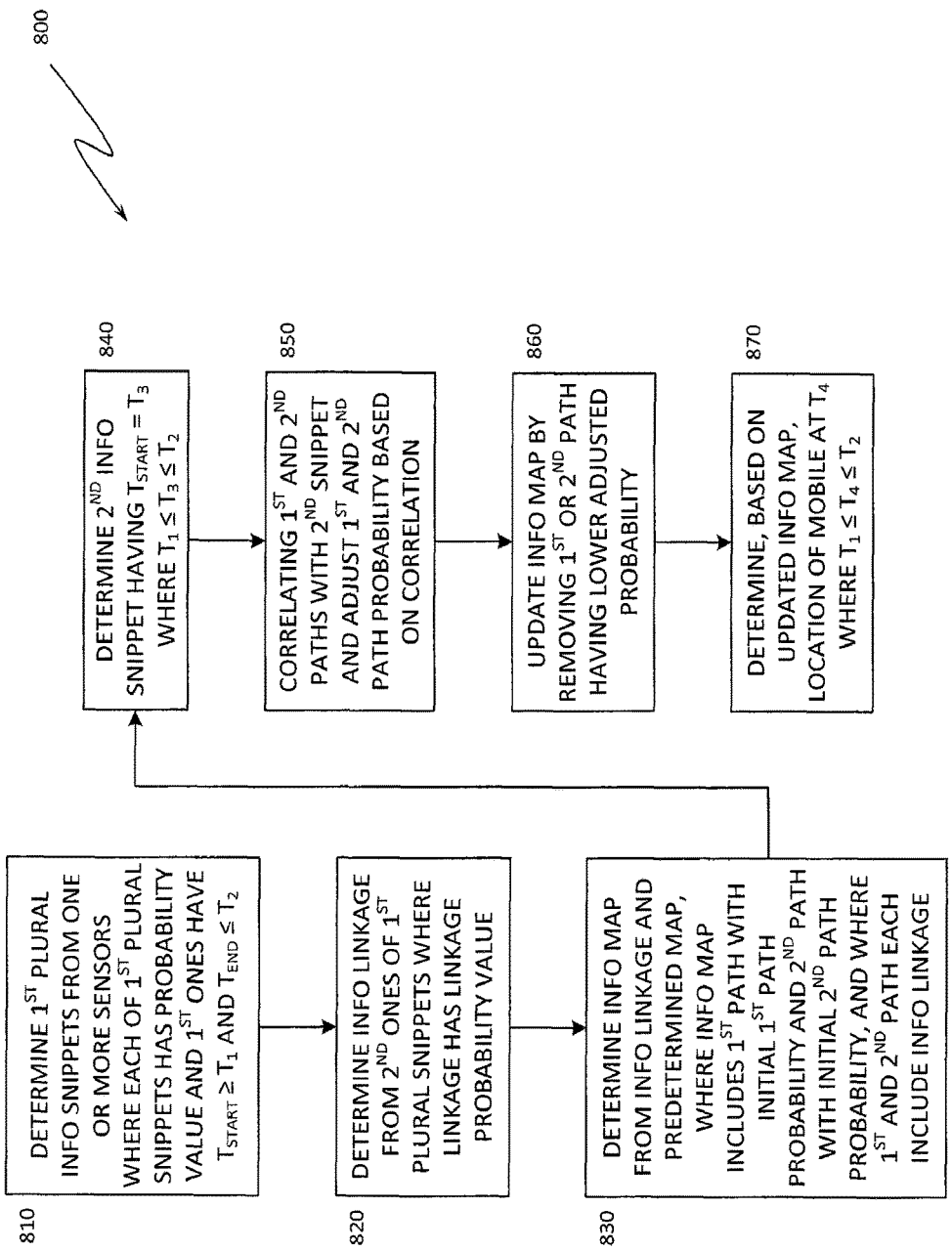
FIG. 8 is another flow chart for a method of determining a location of a mobile device according to an embodiment of the present subject matter.

Considering FIG. 8, a flow chart 800 is presented for a method of determining a location of a mobile device according to an embodiment of the present subject matter.

At block 810, a first plurality of information snippets is determined from one or more sensors associated with a mobile device. Each of the first plurality of snippets has associated therewith a probability value and first ones of the first plural snippets have a respective start time and an end time. The start times of the first ones of the first plural snippets are at or after time $T_1$, and the end times of the first or of the first plural snippets are at or before time $T_2$. At block 820, an information linkage is determined from second ones of the first plurality of snippets where the linkage has associated therewith a linkage probability value. At block 830, an information map is determined from the information linkage and from a predetermined map. The information map includes a first path having an initial first path probability value and a second path having an initial second path probability value. Each of the first and second paths includes the information linkage.

At block 840, a second information snippet is determined from the one or more sensors where the second information snippet has a start time $T_3$ such that $T_1 \leq T_3 \leq T_2$. At block 850, the first and second paths are correlated with the second snippet and the initial first and second path probability are adjusted based on the correlation. At block 860, the information map is updated by removing the first or second path having a lower adjusted path probability value. At block 870, a location of the mobile device is determined based on the updated information map where the mobile device is located for a time $T_4$ where $T_1 \leq T_4 \leq T_2$.

In an embodiment the first ones of the plural snippets are the same as the second ones of the plural snippets. In an embodiment, the first and second initial path probability values are different. In an embodiment, the second information snippet may include one or more of the following: information transmitted by a fixed beacon device, information transmitted by a mobile beacon device, information transmitted by the first mobile device, information from a visual code; information from a QR code, and combination thereof.

Figure 9:
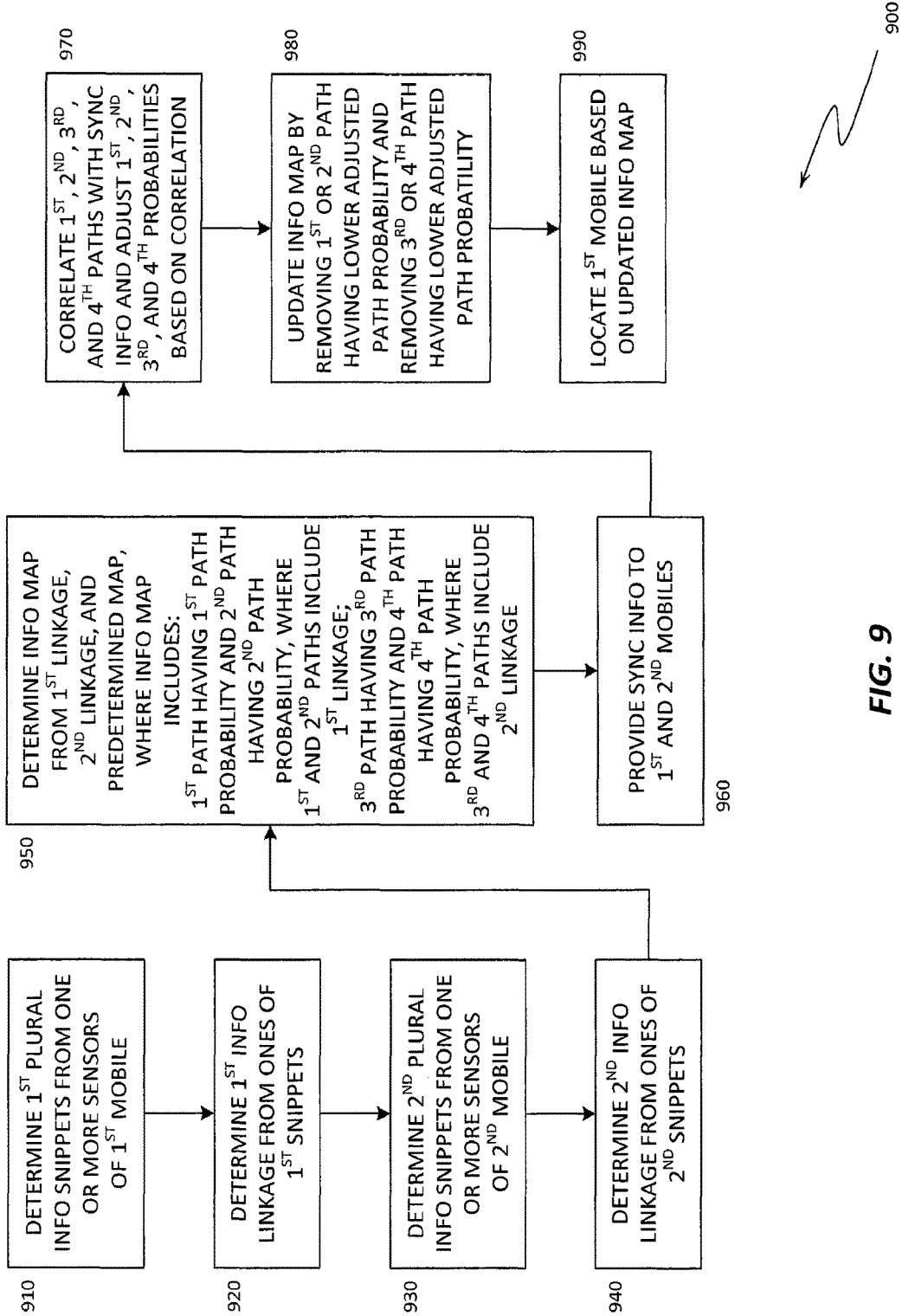
FIG. 9 is a further flow chart for a method of determining a location of a mobile device according to an embodiment of the present subject matter.

Turning to FIG. 9, a flow chart 900 is presented for a method of determining a location of a mobile device according to an embodiment of the present subject matter.

At block 910, a first plurality of information snippets is determined from one or more sensors associated with a first mobile device. At block 920, a first information linkage is determined from ones of the first plural snippets. At block 930, a second plurality of information snippets is determined from one or more sensors associated with a second mobile device. At block 940, a second information linkage is determined from ones of the second plural snippets. At block 950, an information map is determined from the first linkage, the second linkage, and a predetermined map. The information map includes: a first path having a first path probability value and a second path having a second path probability value, were each of the first and second paths includes the first linkage; and a third path having a third path probability value and a fourth path having a fourth path probability value, where each of the third and fourth paths includes the second linkage.

At block 960, synchronizing information is provided to the first and second mobile devices. At block 970, the first, second, third, and fourth paths are correlated with the synchronizing information. The first, second, third, and fourth path probability values are adjusted based on the correlation. At block 980, the information map is updated by removing the first or second path having a lower adjusted path probability value between them. The information map is further updated by removing the third and fourth path having a lower adjusted path probability value between them. At block 990, the first mobile device is located based on the updated information map.

Figure 10:
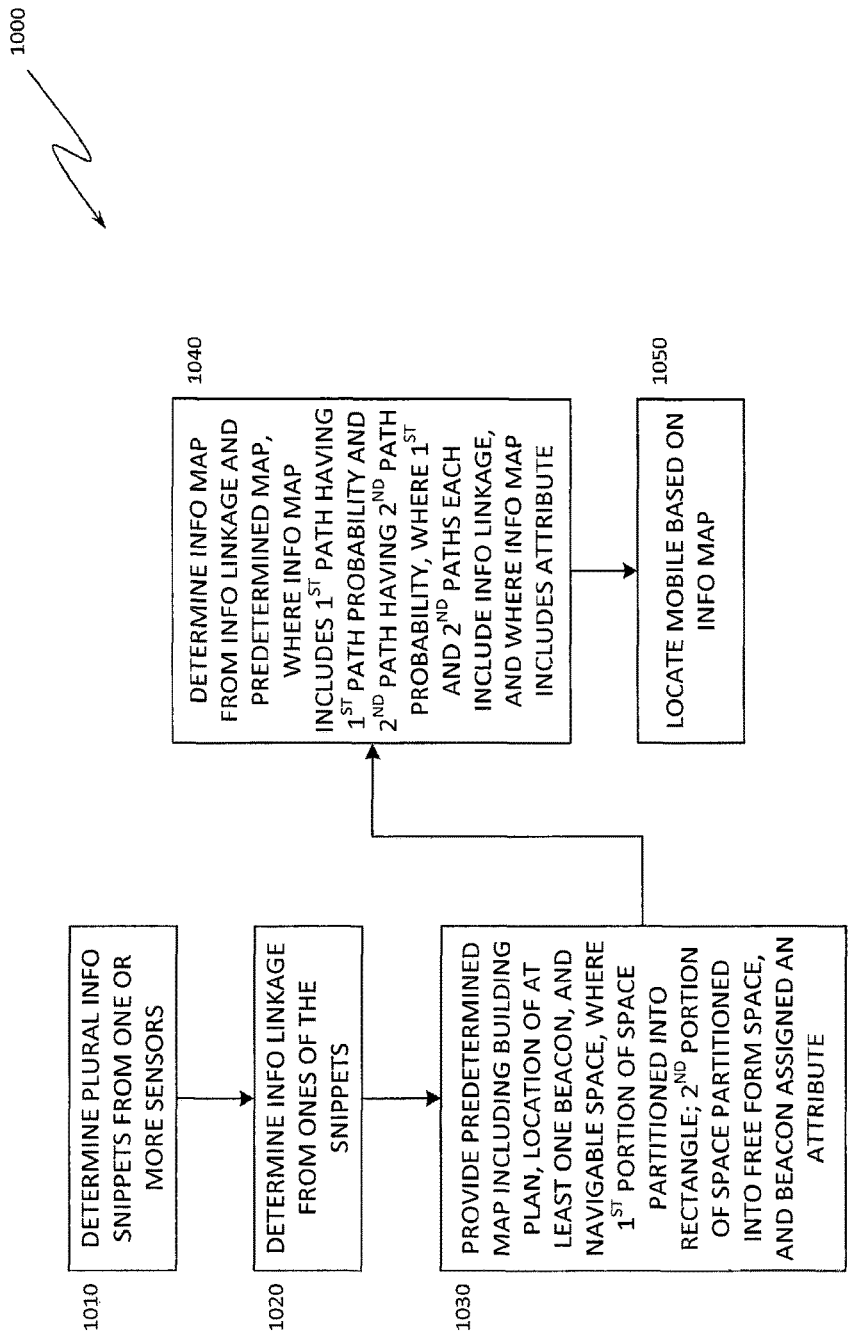
FIG. 10 is yet as further flow chart for a method of determining a location of a mobile device according to an embodiment of the present subject matter.

FIG. 10 depicts a flow chart 1000 for a method of determining a location of a mobile device according to an embodiment of the present subject matter.

At block 1010, a plurality of information snippets are determined from one more sensors associated with a mobile device. At block 1020, an information linkage is determined from ones of the plural snippets. At block 1030, a predetermined map is provided which includes is building plan and at least one location of a fixed electromagnetic, visual, or audio beacon device. The predetermined map includes navigable space where: a first portion of the navigable space is partitioned into rectangular space; a second portion of the navigable space is partitioned into a free-form shape; and the beacon device is assigned an attribute.

At block 1040, an information map is determined from the information linkage and the predetermined map. The information map includes a first path having a first path probability value and a second path having a second path probability value. Each of the first and second paths includes the information linkage, and the information map includes the attribute. At block 1050, the mobile device is located based on the information map.

In an embodiment, the building plan is a floor plan or environmental model. In an embodiment, the mobile device is located as a function of the first path probability value. In an embodiment, the mobile device is located as a function of the attribute. In an embodiment, the mobile device is located using a technique such as: a jigsaw puzzle-solving algorithm; a topology technique, a graph theory technique, and combinations thereof. I a further embodiment, the attribute is selected from the group consisting of: color, picture, visual pattern, and combinations thereof. In a further embodiment, a third portion of the navigable space may contain more than one path.

Certain embodiments of the present disclosure may be implemented by a computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended, to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described, in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected, by any form or medium of digital data communication, e.g., a communication network. Examples of communication networks include a local area network (LAN) and a wide area network (WAN), e.g., the Internet.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of locating a mobile device, the method comprising the steps of:
   (a) determining a plurality of information snippets from one or more sensors associated with a mobile device;
   (b) determining an information linkage from ones of the plural snippets, wherein the information linkage includes a series of the plurality of snippets over time to form a geometric object;
   (c) determining an information map for the mobile device using the linkage and a predetermined map, wherein the linkage is fit into a topological framework of the predetermined map, wherein the information map includes a number of line segments and associated information; and
   (d) locating the mobile device based on the information map.

2. The method of claim 1 wherein the one or more sensors are selected from the group consisting of: accelerometer, magnetometer, gyroscope, barometer, light sensor, proximity sensor, temperature sensor, humidity sensor, environmental sensor, biological sensor, camera, microphone, electromagnetic sensor, electromagnetic signal measuring device, electromagnetic signal analysis device, communication device, application program, user-input device, and combinations thereof.

3. The method of claim 1 wherein one of the plurality of snippets includes information received from the group of information providers consisting of: second mobile device, application program, wireless electronic beacon signal, visual code, QR code, MEMs device, and combinations thereof.

4. The method of claim 1 wherein one of the plurality of snippets includes information selected from the group consisting of: time stamp, time interval, probability value, pattern matching algorithm, event descriptor, information input to the mobile device from a user of the mobile device, information from a second mobile device, a predetermined set of information for the user of the mobile device, and combinations thereof.

5. The method of claim 1 wherein the predetermined map contains information selected from the group consisting of: environmental model, floor plan, building plan, location of a fixed electromagnetic, visual, or audio beacon, and combinations thereof.

6. The method of claim 1 wherein the determination of the information map includes determining one or more arrangements of the linkage within the predetermined map and assigning a probability value to each of the arrangements.

7. The method of claim 6 wherein the mobile device is located as a function of the assigned probability value of one of the arrangements.

8. The method of claim 1 wherein one of the plurality of snippets is a time-bounded informational unit.

9. The method of claim 1 wherein one of the plurality of snippets is a time-stamped informational unit.

10. The method of claim 1 wherein a first one of the plurality of snippets is associated with a start time, and end time, and a behavioral information unit.

11. The method of claim 10 wherein at least one of the start time and the end time has associated therewith a first snippet probability value.

12. The method of claim 11 wherein the first snippet is converted into a first sub-snippet and a second sub-snippet.

13. The method of claim 12 wherein a start time of the first sub-snippet is earlier in time than a start time of the second sub-snippet and wherein the start time of the second sub-snippet is earlier in time than an end time of the first sub-snippet.

14. The method of claim 13 wherein the first sub-snippet has associated therewith a first sub-snippet probability value and the second sub-snippet has associated therewith a second sub-snippet probability value.

15. The method of claim 12 wherein the first snippet includes a first behavioral information unit of the user and a second behavioral information unity of the user and wherein the first sub-snippet does not contain the second behavioral information unit.

16. The method of claim 1 wherein the linkage includes two of the plural snippets and a string which represents a time span between an end time of one of the two snippets and a beginning time of the other of the two snippets.

17. The method of claim 1 wherein the linkage has associated therewith a probability value.

18. The method of claim 1 wherein the linkage includes a first snippet for which a first distance measurement determined and a second snippet for which a second distance measurement is determined, wherein the first and second distance measurements are determined using input from the one or more sensors.

19. The method of claim 18 wherein the first snippet includes a first behavioral information unit of the user and the second snippet includes a second behavioral information unit of the user.

20. The method of claim 19 wherein the first and second behavioral information units are not the same.

21. The method of claim 1 wherein the linkage includes a first one of the plural snippets having a start time and an end time and a second one of the plural snippets having a time stamp.

22. A method of locating a mobile device, the method comprising the steps of:
   (a) determining a first plurality of information snippets from one or more sensors associated with a mobile device wherein each of the first plurality of snippets has associated therewith a probability value, and wherein first ones of the first plural snippets have a respective start time and end time, and wherein the start times of the first ones of the first plural snippets are at or after $T_1$, and wherein the ends times of the first ones of the first plural snippets are at or before time $T_2$;
   (b) determining an information linkage from second ones of the first plurality of snippets wherein the linkage has associated therewith a linkage probability value;
   (c) determining an information map from the information linkage and a predetermined map, wherein the information map includes a first path having an initial first path probability value and a second path having an initial second path probability value, and wherein each of the first and second paths includes the information linkage;
   (d) determining a second information snippet from the one or more sensors, wherein the second information snippet has a start time $T_3$ where $T_1 \leq T_3 \leq T_2$;
   (e) correlating the first and second paths with the second snippet and adjusting the initial first and second path probability values based on the correlation;

(f) updating the information map by removing the first or second path having a lower adjusted path probability value; and (g) determining, based on the updated information, a location of the mobile device, wherein the mobile device is located for a time $T_4$ where $T_1 \leq T_4 \leq T_2$.

23. The method of claim 22 wherein the first ones of the plural snippets are the same as the second ones of the plural snippets.

24. The method of claim 22 wherein the first and second initial path probability values are different.

25. The method of claim 22 wherein the second information snippet is selected from the group consisting of: information transmitted by a fixed beacon device, information transmitted by a mobile beacon device, information transmitted by the first mobile device, information from a visual code; information from a QR code, and combination thereof.

26. A method of locating a mobile device, the method comprising the steps of:

(a) determining a first plurality of information snippets from one or more sensors associated with a first mobile device;

(b) determining a first information linkage from ones of the first plural snippets;

(c) determining a second plurality of information snippets from one or more sensors associated with a second mobile device;

(d) determining a second information linkage from ones of the second plural snippets;

(e) determining an information map from the first linkage, the second linkage, and a predetermined map, wherein the information map includes:

i. a first path having a first path probability value and a second path having a second path probability value, wherein each of the first and second paths includes the first linkage; and ii. a third path having a third path probability value and a fourth path having a fourth path probability value, wherein each of the third and fourth paths includes the second linkage;

(f) providing synchronizing information to the first and second mobile devices;

(g) correlating the first, second, third, and fourth paths with the synchronizing information and adjusting the first, second, third, and fourth path probability values based on the correlation;

(h) updating the information map by removing the first or second path having a lower adjusted path probability value between them and by removing the third and fourth path having a lower adjusted path probability value between them; and (i) locating the first mobile device based on the updated information map.

27. A method of locating a mobile device, the method comprising the steps of:

(a) determining a plurality of information snippets from one or more sensors associated with a mobile device;

(b) determining an information linkage from ones of the plural snippets;

(c) providing a predetermined map including a building plan and at least one location of a fixed electromagnetic, visual, or audio beacon device, wherein the predetermined map includes navigable space, and wherein:

i. a first portion of the navigable space is partitioned into rectangular space;

ii. a second portion of the navigable space is partitioned into a free-form shape; and iii. the beacon device is assigned an attribute;

(d) determining an information map from the information linkage and the predetermined map, wherein the information map includes a first path having a first path probability value and a second path having a second path probability value, wherein each of the first and second paths includes the information linkage, and wherein the information map includes the attribute;

(e) locating the mobile device based on the information map.

28. The method of claim 27 wherein the building plan is a floor plan or environmental model.

29. The method of claim 27 wherein the mobile device is located as a function of the first path probability value.

30. The method of claim 27 wherein the mobile device is located as a function of the attribute.

31. The method of claim 27 wherein the mobile device is located using a technique selected from the group consisting of: a jigsaw puzzle-solving algorithm; a topology technique, a graph theory technique, and combinations thereof.

32. The method of claim 31 wherein the attribute is selected from the group consisting of: color, picture, visual pattern, and combinations thereof.

33. The method of claim 31 wherein a third portion of the navigable space may contain more than one path.

* * * * *